United States Patent
Ono

(10) Patent No.: US 8,928,933 B2
(45) Date of Patent: Jan. 6, 2015

(54) INFORMATION PROCESSING APPARATUS FOR GENERATING PRINTING DATA BY DIFFERENT METHODS, COMPUTER READABLE RECORDING MEDIUM AND METHOD OF CONTROLLING THE INFORMATION PROCESSING APPARATUS

(75) Inventor: Akiyoshi Ono, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 214 days.

(21) Appl. No.: 13/590,589

(22) Filed: Aug. 21, 2012

(65) Prior Publication Data
US 2013/0063737 A1   Mar. 14, 2013

(30) Foreign Application Priority Data
Sep. 8, 2011   (JP) ................................ 2011-196124

(51) Int. Cl.
G06K 15/02   (2006.01)
G06F 3/12   (2006.01)

(52) U.S. Cl.
CPC ............ *G06F 3/1205* (2013.01); *G06F 3/1247* (2013.01); *G06F 3/1255* (2013.01); *G06F 3/1285* (2013.01)
USPC .............................. 358/1.6; 358/1.1; 358/1.13

(58) Field of Classification Search
USPC .......... 358/1.1, 1.9, 3.21, 1.13, 1.16, 448, 1.6
See application file for complete search history.

(56) References Cited

U.S. PATENT DOCUMENTS

| | | | |
|---|---|---|---|
| 7,161,693 B2* | 1/2007 | Kizaki et al. | 358/1.13 |
| 8,094,326 B2* | 1/2012 | Inui | 358/1.12 |
| 2003/0184781 A1* | 10/2003 | Laughlin | 358/1.13 |
| 2009/0021769 A1* | 1/2009 | Edmonds | 358/1.15 |
| 2009/0213422 A1 | 8/2009 | Ono | |
| 2012/0176641 A1 | 7/2012 | Ono | |

FOREIGN PATENT DOCUMENTS

JP   2009-230426   10/2009

* cited by examiner

*Primary Examiner* — Thomas D Lee
(74) *Attorney, Agent, or Firm* — Harness, Dickey & Pierce, P.L.C.

(57) ABSTRACT

An information processing apparatus includes a printing setting reception part generating setting information from printing settings when a printing request is given by an application; an image processing part converting document data obtained from the application into printing data for a printer based on the setting information; and a determination part determining whether the application having called the image processing part is a specific application, by determining at least one of whether the setting information includes specific application information described by the application and whether the specific application information is included in an argument of a function for calling the image processing part. When it has been determined that the specific application has called the image processing part, the image processing part generates the printing data by a method different from a method of a case of having been called by an application other than the specific application.

20 Claims, 24 Drawing Sheets

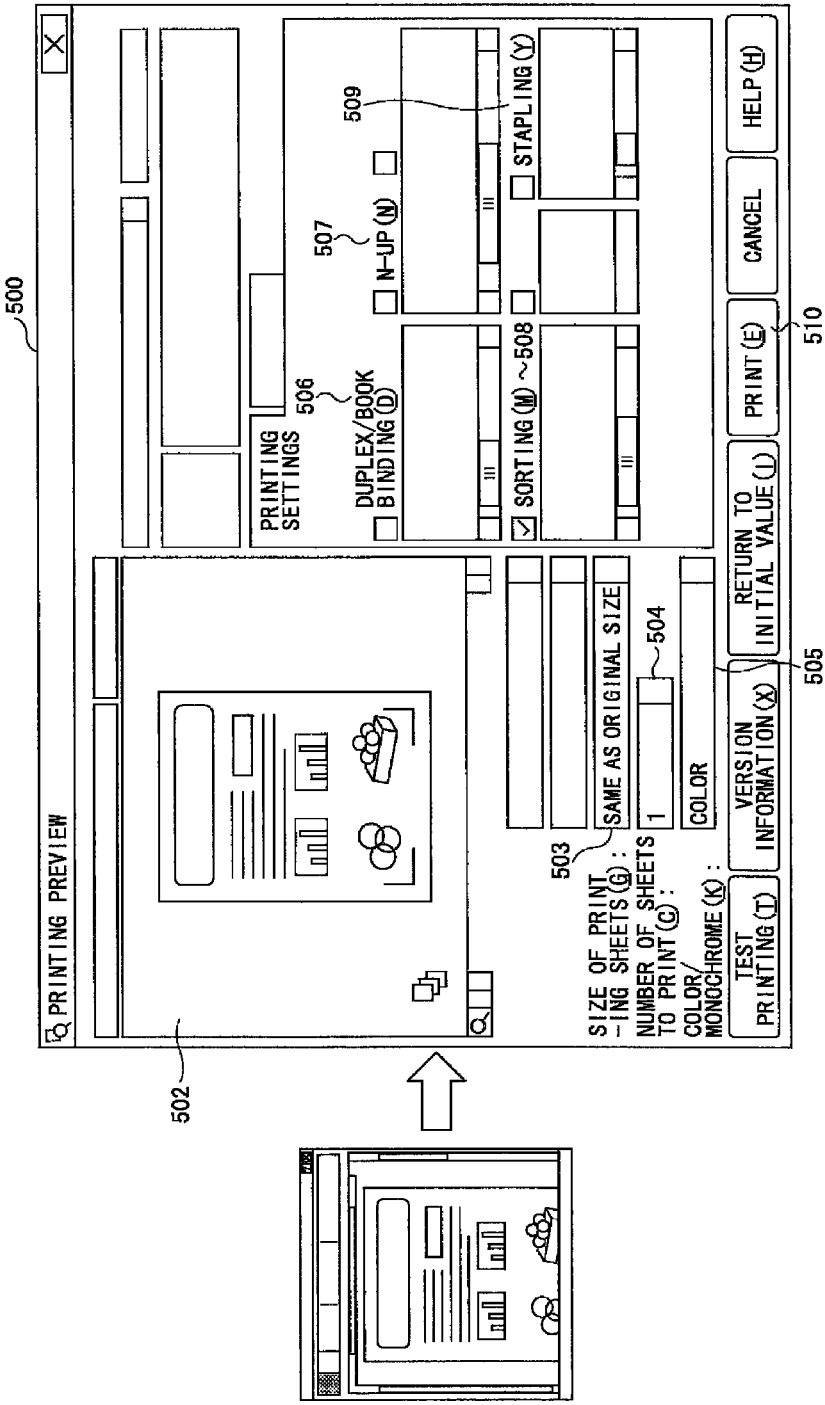

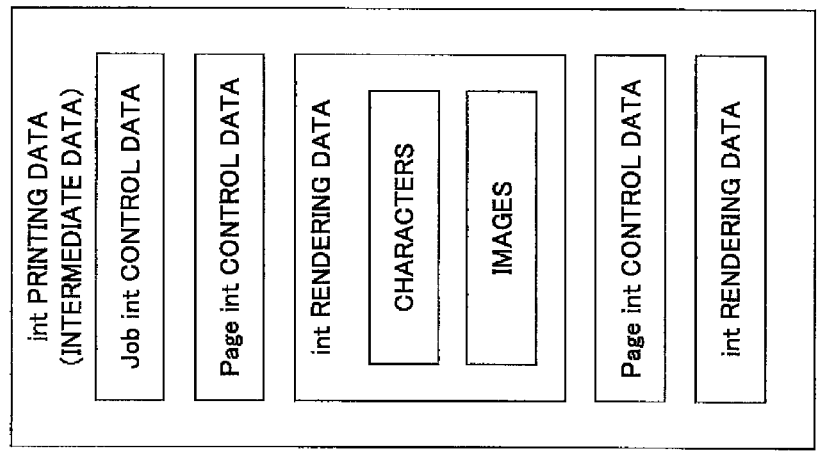
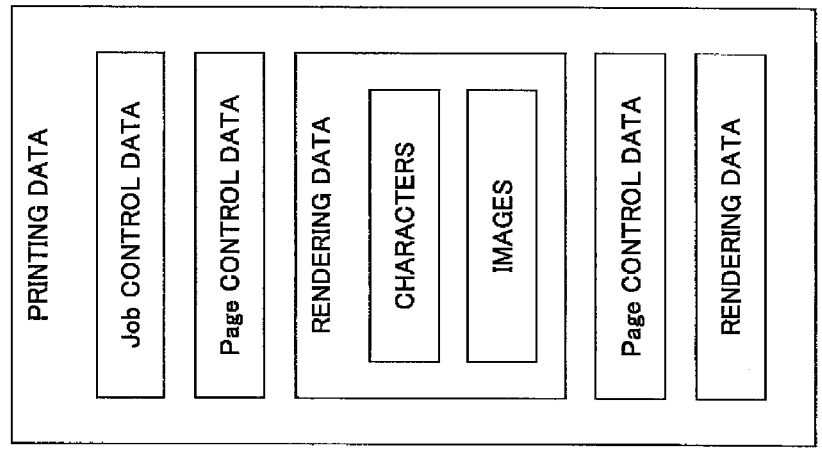

FIG.12A

```
@PJL SET DSTRESOLUTIONW = 600
@PJL SET DSTRESOLUTIONH = 600          } PRINTING RESOLUTION
@PJL SET DSTPAPERRESOLUTIONW = 600
@PJL SET DSTPAPERRESOLUTIONH = 600
@PJL SET DSTPAPERLENGTHDOT = 6600
@PJL SET DSTPAPERWIDTHDOT = 5100       } SIZE OF SHEETS OF PAPER
@PJL SET DSTPAPERLENGTHMM = 2790
@PJL SET DSTPAPERWIDTHMM = 2160
@PJL SET DSTPAPERPRNLENGTHDOT = 6360
@PJL SET DSTPAPERPRNWIDTHDOT = 4860
@PJL SET DSTPRNXOFFSET = 120           } MARGIN OF SHEETS OF PAPER
@PJL SET DSTPRNYOFFSET = 120
@PJL SET COPIES = 1          ~ NUMBER OF COPIES
@PJL SET TRAY = ALL          ~ PAPER SUPPLY TRAY
@PJL SET MEDIATYPE = PLAINORRECYCLED   ~ TYPE OF SHEETS OF PAPER
@PJL SET NUP = 2IN1P1        ~ N-UP PRINTING
```

FIG.12B

```
@PJL SET APLPAGESIZE = LETTER          ~ SIZE OF ORIGINAL SHEETS OF PAPER
@PJL SET APLPAGELAYOUT = PORTRAIT      ~ ORIENTATION OF ORIGINAL SHEETS OF PAPER
@PJL SET SRCRESOLUTIONH = 600         ⎫
@PJL SET SRCRESOLUTIONW = 600         ⎬ RESOLUTION OF ORIGINAL SHEETS OF PAPER
@PJL SET SRCPAPERLENGTHDOT = 6600     ⎫
@PJL SET SRCPAPERWIDTHDOT = 5100      ⎪
@PJL SET SRCPAPERLENGTHMM = 2790      ⎬ SIZE OF ORIGINAL SHEETS OF PAPER
@PJL SET SRCPAPERWIDTHMM = 2160       ⎪
@PJL SET SRCPAPERPRNLENGTHDOT = 6360  ⎪
@PJL SET SRCPAPERPRNWIDTHDOT = 4860   ⎭
@PJL SET SRCPRNXOFFSET = 120          ⎫
@PJL SET SRCPRNYOFFSET = 120          ⎬ MARGIN OF ORIGINAL SHEETS OF PAPER
@PJL SET COLORMODE = 8BIT3PLANE        ~ COLOR MODE
@PJL SET IMAGEPRINT = OFF              ~ WHETHER IMAGE PRINTING IS INCLUDED
```

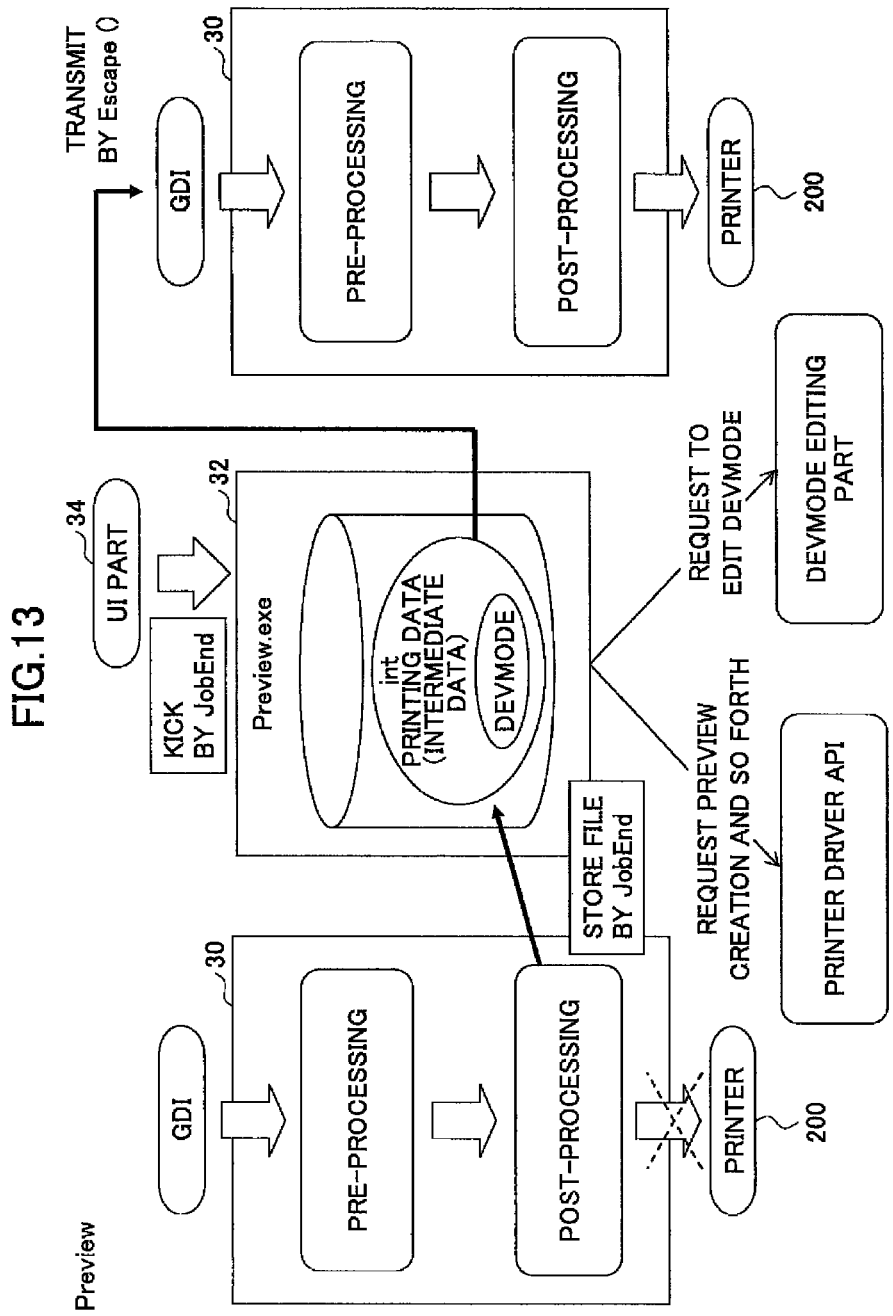

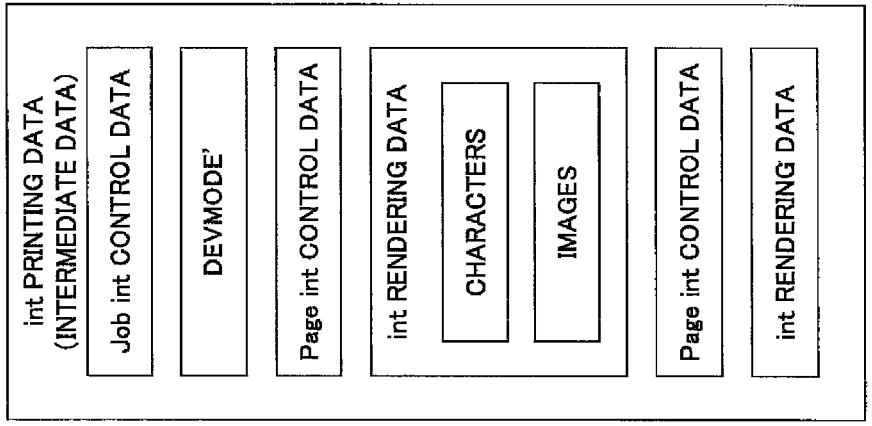
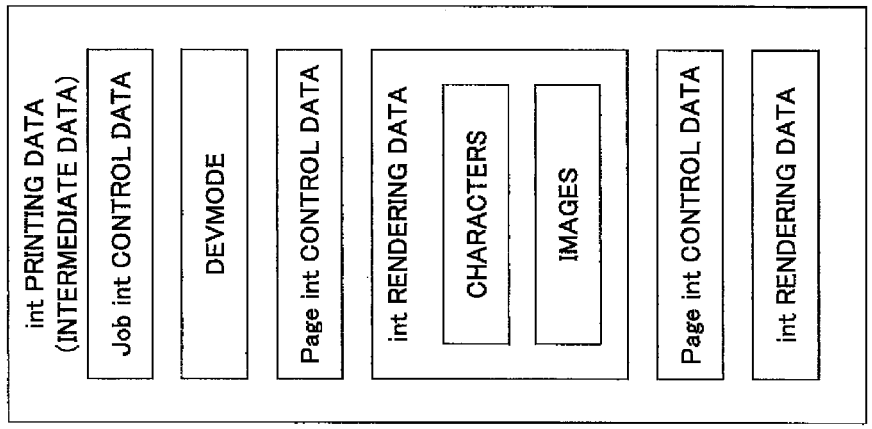

```
typedef struct {
    int     cbSize;
    LPCTSTR lpszDocName;
    LPCTSTR lpszOutput;
    LPCTSTR lpszDatatype;
    DWORD   fwType;
} DOCINFO, *LPDOCINFO;
```

FIG.18A

```
BOOL
DrvStartDoc(
    IN SURFOBJ *pso,
    IN LPWSTR  pwszDocName,
    IN DWORD   dwJobId
    );
```

| DOCUMENT NAME OF DOCUMENT DATA | DOCUMENT NAME TO BE SET IN lpszDocName OF DOCINFO STRUCTURE |
|---|---|
| memo pad -untitled- | memo pad -untitled-_PREVIEW |

INFORMATION PROCESSING APPARATUS FOR GENERATING PRINTING DATA BY DIFFERENT METHODS, COMPUTER READABLE RECORDING MEDIUM AND METHOD OF CONTROLLING THE INFORMATION PROCESSING APPARATUS

BACKGROUND OF THE INVENTION

1. Field of the Invention

The present invention relates to an information processing apparatus that converts document data from an application and transmits the converted data to a printer.

2. Description of the Related Art

When a user prints document data that has been created using an application or the like, printing data is transmitted to a printer through a process carried out by the application, a printer driver and an Operating System (OS) in cooperation. In a case where the OS of a Personal Computer (PC) in which the application operates is Windows (registered trademark), there are two types of a printing process:

Windows printing scenario of RAW spooling
Windows printing scenario of EMF spooling FIG. 1 illustrates a general configuration of one example of a Windows printing scenario of RAW spooling. A PC 600 has an application 601, and, as functions of an OS (not shown), has a Graphical Device Interface (GDI) 602, a printer driver 610, a spooler 603, a printer processor 606 and a port monitor 605.

The printer driver 610 includes a User Interface (UI) part 612 and a graphics part 611. When a user inputs an instruction for printing a document to the application 601, the application 601 sends a DEVMODE structure (hereinafter, simply referred to as DEVMODE) to the UI part 612 of the printer driver 610. DEVMODE is a data structure in which member variables are defined for setting printing conditions in printer drivers of various types that operate on an OS in common. In response to receiving DEVMODE, the UI part 612 of the printer driver 610 displays a printing setting screen page (also may be called a "printing dialog") on a display device.

The user sets printing conditions such as a paper sheet size, the required number of copies, duplex printing, and/or the like, by the displayed printing setting screen page, and inputs an instruction for printing. The UI part 612 receives the printing conditions that have been thus set by the user, and sends DEVMODE that includes the printing settings to the application 601.

The application 601 shown in FIG. 1 is, for example, an application of a document creation program (for example, MS-Word (registered trademark)). When having received DEVMODE from the UI part 612, the application 601 calls the GDI 602 with a GDI call, and sends DEVMODE and the document data to the GDI 602.

When having received DEVMODE and the document data from the application 601, the GDI 602 calls the graphics part 611 of the printer driver 610 by a DDI call, and sends DEVMODE and the document data to the graphics part 611.

The graphics part 611 reads DEVMODE obtained from the GDI 602 uses the document data for which the application 601 has given an instruction to print, creates printing data (RAW data) 800 that reflects the printing settings, and sends the created printing data 800 to the spooler 603. It is noted that the printing data 800 includes rendering data (for example, PDL data) and control data (for example, a PJL printing command).

The spooler 603 stores the printing data 800 obtained from the graphics part 601 as a spool file 604. The printer processor 606 processes the printing data 800 and sends the processed printing data 800 to the spooler 603. The spooler 603 sends the printing data 800 to the port monitor 605. The port monitor 605 monitors ports that the PC 600 has, and sends the printing data 800 to a port to which the printer 700 is connected. The printer 700 prints the printing data 800.

FIG. 2 illustrates one example of a general configuration of the above-mentioned "Windows printing scenario of EMF spooling". According to the "Windows printing scenario using EMF spooling", the processes from the printing instruction by the user through the calling of the GDI 602 by the application 601 are the same as those of FIG. 1.

Then, the GDI 602 generates EMF data 900 and sends the generated EMF data 900 to the spooler 603. When all of the document data of the application 601 has been stored in the spooler 603 as EMF data 900, the spooler 603 informs the printer processor 606 of starting despooling, and the printer processor 606 obtains the spool data (EMF data) 900. The printer processor 606 carries out an editing process on the obtained EMF data 900 such as collecting data for each page, reversing the order, preparing for bookbinding and/or the like, and then, carries out a GDI call and sends the thus processed EMF data 900 to the GDI 602.

The GDI 602 calls the graphics part 611 of the printer driver 610 by a DDI call, and sends DEVMODE and the EMF data 900 to the graphics part 611. The graphics part 611 creates printing data (RAW data) 800 using the EMF data 900 and DEVMODE, and sends the created printing data 800 to the spooler 603. When all of the printing data 800 has been thus sent from the graphics part 611, the spooler 603 sends the printing data 800 to the port monitor 605.

DEVMODE has a Public area and a Private area. The Public area is a common area that can be used without regard to particular printers or printer drivers, and common member variables are defined for respective printer drivers that operate on an OS. The Private area is a so-called extended area for defining member variables for each of the printer drivers. Accordingly, in the Private area, it is possible to define member variables to be used to manage printing conditions concerning functions unique to each of the printer drivers (printer).

Thus, in the Private area of DEVMODE, adding and/or updating of the member variables may occur. In order to manage such a Private area of DEVMODE, a technology has been proposed (for example, see a patent reference No. 1 (Japanese Laid-Open Patent Application No. 2009-230426)). The patent reference No. 1 discloses a printer driver in which only the size of a Private area is fixed, and member variables are not fixed. Then, the member variables and the positions thereof are fixed by an information arrangement file. Thereby, it is possible to eliminate the need of re-compiling each printer driver by preparing different information arrangement files for respective printer drivers.

The printer driver described in the patent reference No. 1 can flexibly configure the Private area. Generally speaking, a printer driver is the same even when an application that calls the printer driver differs as long as a printer is the same.

However, there is a case where it is preferable to carry out a specific process only in a case where a printer driver is called by a specific application. For example, the graphics part 611 creates the control data from DEVMODE. Further, the graphics part 611 also creates the control data from information of document data that the application 601 has or from information not included in DEVMODE. However, there is a case where the specific application does not have information of document data that a general application has. In such a case, the printer driver may create the control data that is erroneous.

If the printer driver can detect that it has been called by the specific application, it is possible to use the control data created by the graphics part 611 called by the general application, or not to create the control data. However, generally speaking, the printer driver has no such a system of detecting that it has been called by the specific application.

SUMMARY OF THE INVENTION

According to one aspect, an information processing apparatus has a printing setting reception part that generates setting information from received printing settings at a time of a printing request given by an application; an image processing part that converts document data obtained from the application into printing data for a printer based on the setting information; and an application determination part that determines whether the application that has called the image processing part is a specific application, from at least any one of whether the setting information includes specific application information described by the specific application and whether an argument of a function for calling the image processing part includes specific application information. In a case where the application determination part has determined that the image processing part has been called by the specific application, the image processing part generates the printing data by a method different from a method of a case where the image processing determination part has determined that the image processing part has been called by the application other than the specific application.

Other objects, features and advantages of the present invention will become more apparent from the following detailed description when read in conjunction with the accompanying drawings.

BRIEF DESCRIPTION OF THE DRAWINGS

FIGS. 8A and 8B show an example of settings for preview displaying in a printing setting screen page;

FIGS. 11A and 11B illustrate printing data of pre-processing and post-processing;

FIG. 12A shows one example of Job int control data;

FIG. 12B shows one example of Page int control data;

FIG. 13 schematically illustrates one example of processes of the PC;

FIGS. 14A and 14B schematically illustrate int printing data to be transmitted to the printer driver from the Preview.exe;

FIGS. 18A and 18B show examples of a format of a DOCINFO structure;

FIG. 19 shows one example of a document name given by the Prview.exe; and

DETAILED DESCRIPTION OF THE EMBODIMENTS

Below, an information processing apparatus, a computer readable information recording medium and a method of controlling an information processing apparatus will be described by embodiments.

First Embodiment

Figure 1:
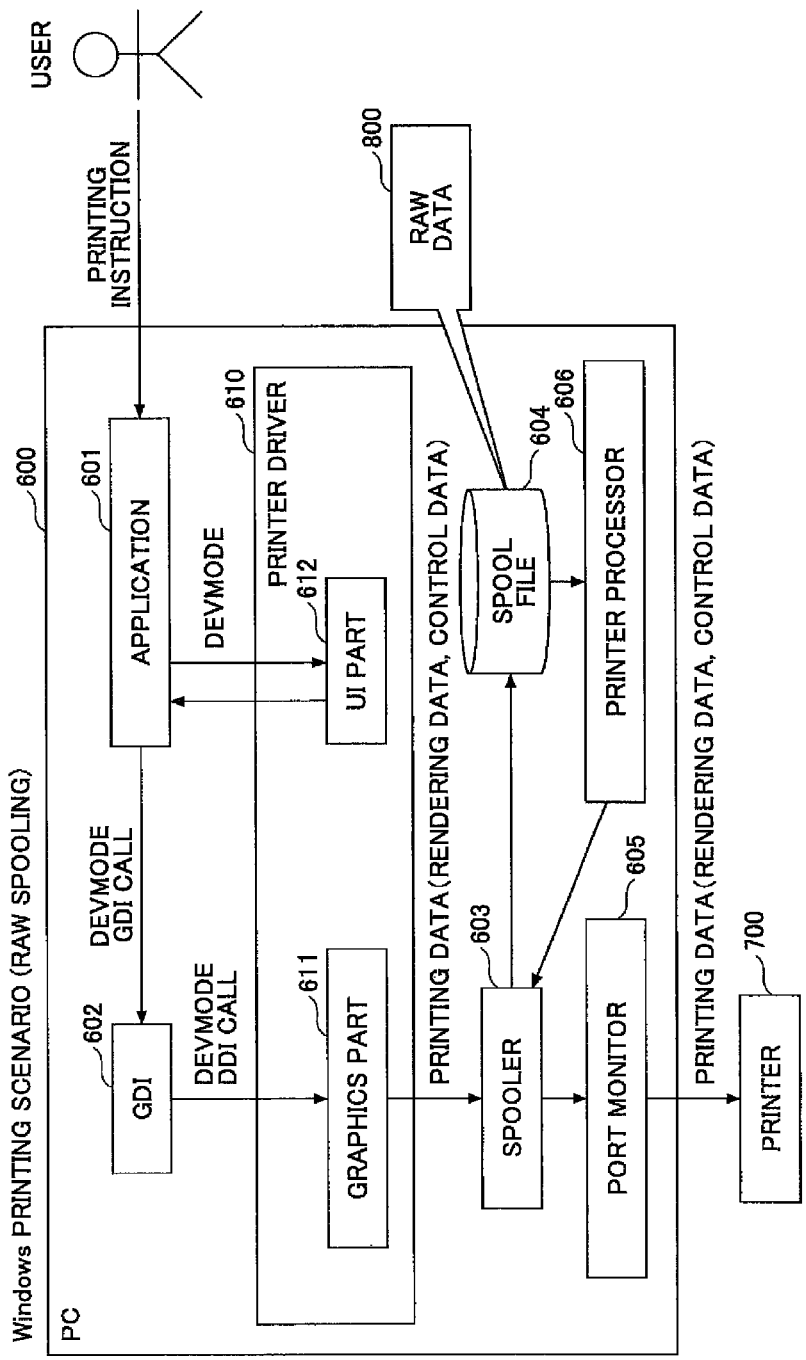
FIG. 1 generally illustrates one example of a "Windows printing scenario using RAW spooling"
Figure 2:
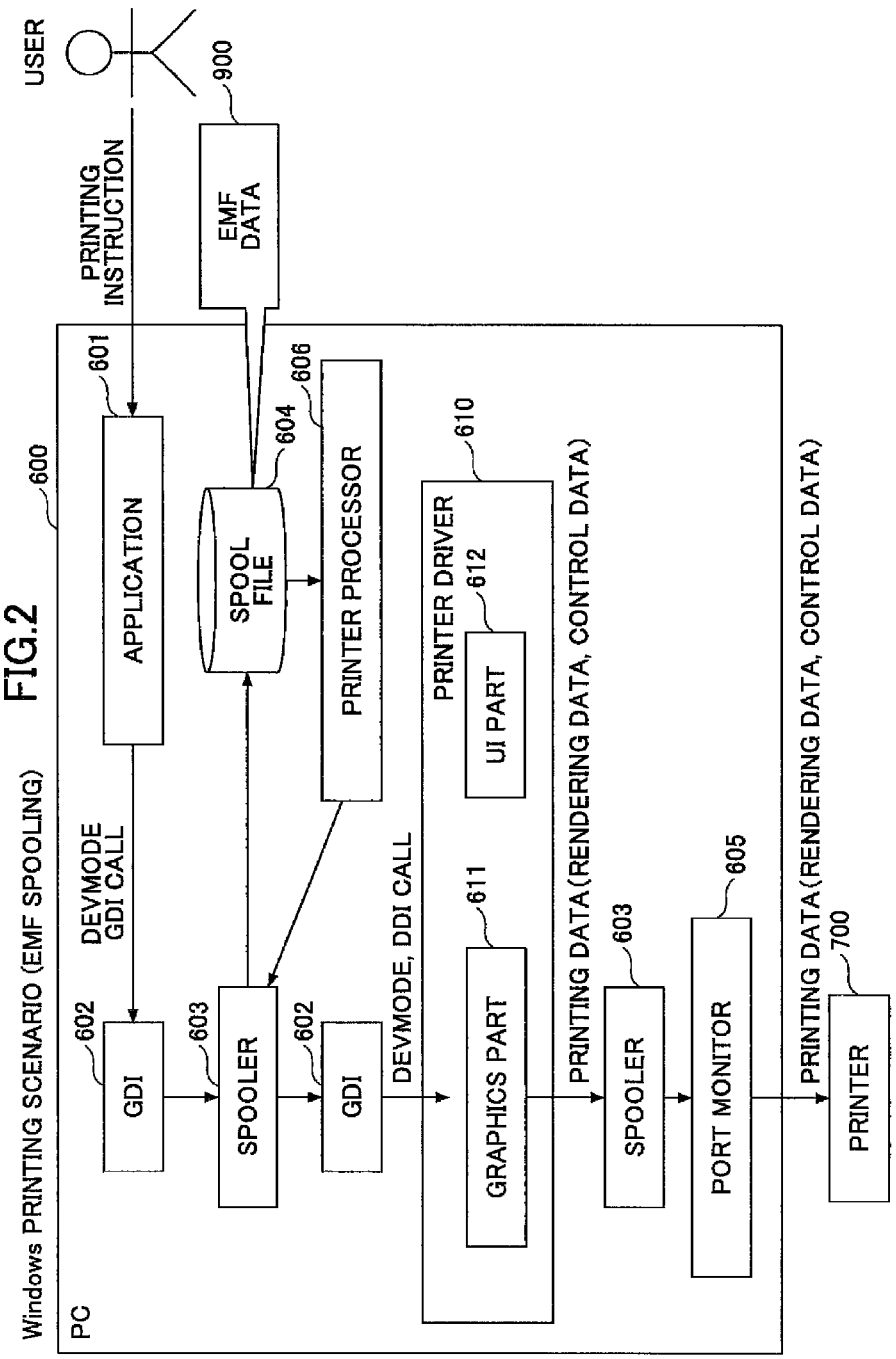
FIG. 2 generally illustrates one example of a "Windows printing scenario using EMF spooling"
Figure 3:
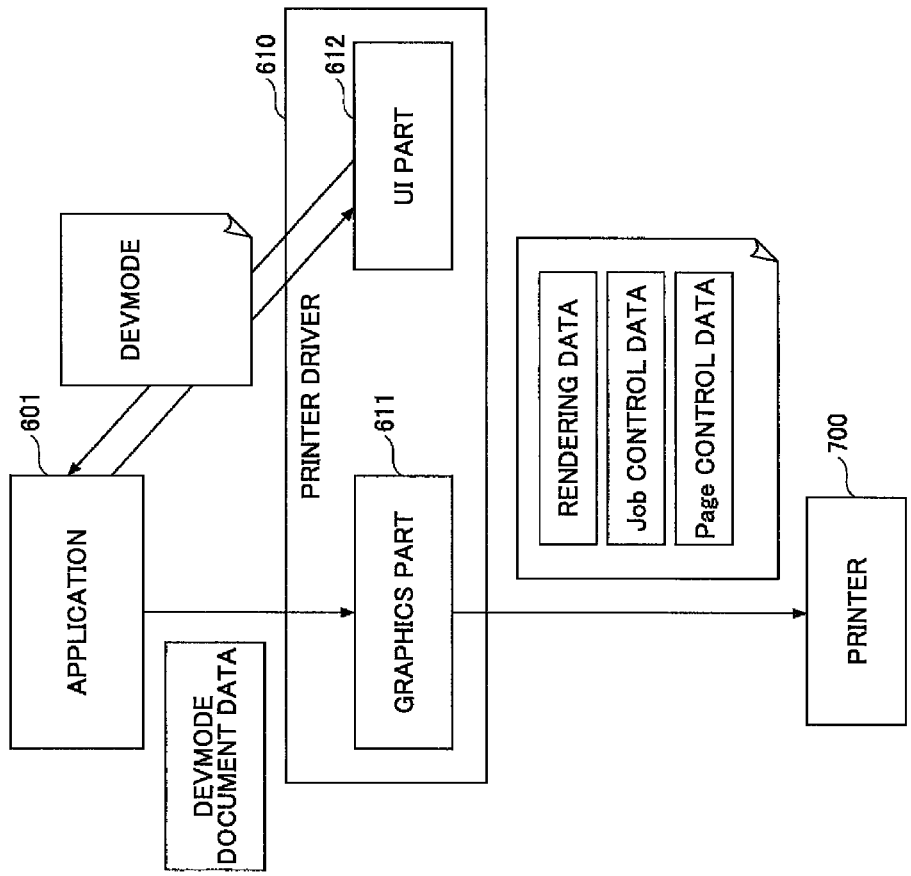
FIG. 3 schematically illustrates a procedure of generating printing data or the like by a printer driver of the related art for the purpose of comparison.

FIG. 3 schematically shows one example of a procedure of generating printing data or the like by a printer driver in the related art for comparison. It is noted that a printing procedure according to the first embodiment can be applied to both RAW spooling and EMF spooling. Thus, they are not distinguished in the following descriptions.

As mentioned above, the UI part 612 receives printing settings from a user, stores DEVMODE, and sends DEVMODE to an application 601. The application 601 is a general term of software such as document creation software, browser software or the like for creating document data to be printed.

The application 601 sends DEVMODE and document data to the graphics part 611. The "document data" includes not only the contents of a document but also bibliographic matters such as a size of original sheets of paper, an orientation of the original sheets of paper, and/or the like.

The graphics part 611 of the printer driver 610 creates, from DEVMODE and document data, rendering data (RAW data), Job control data and Page control data, and sends the created data to the printer 700. The Job control data and the Page control data will be described later. The printer 700 interprets the Job control data and the Page control data, and thus, can print the rendering data (RAW data).

Figure 4:
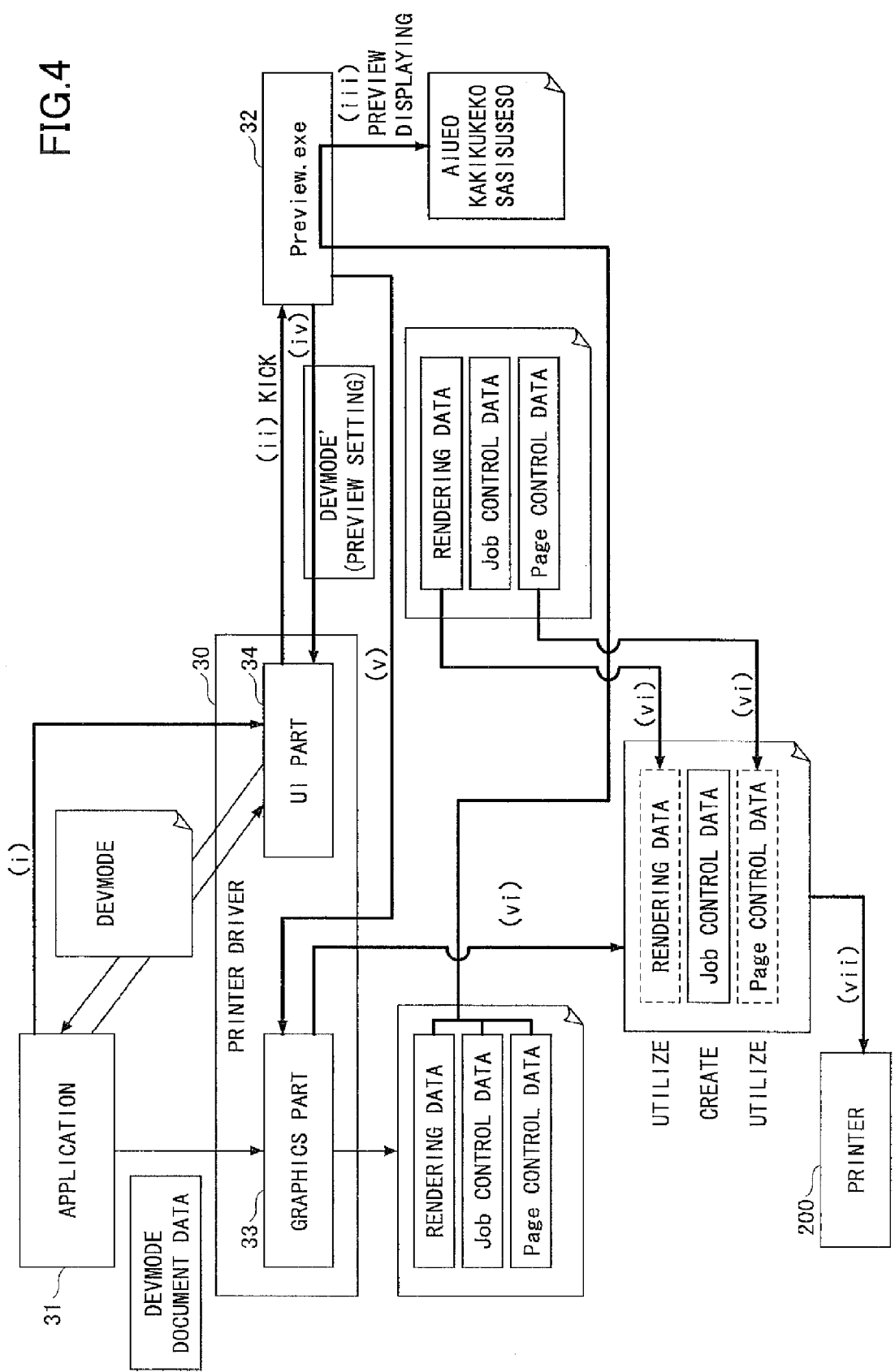
FIG. 4 schematically illustrates a procedure of generating printing data or the like by a printer driver.

FIG. 4 schematically illustrates a procedure of generating printing data or the like by a printer driver 30 according to the first embodiment. In FIG. 4, the procedure of generating, by a graphics part 33, rendering data, Job control data and Page control data, is the same as FIG. 3. However, to these items of data, a prefix "int" is attached for the purpose of identification.

When a user gives an instruction for printing to an application 31, the user sets "to display printing preview screen page" by the PC before the printing is started. An application 32 for thus carrying out preview displaying corresponds to a "specific application", and will be hereinafter referred to as a Preview.exe 32.

(i) After creating rendering data, Job control data and Page control data, the graphics part 33 reports this fact to the application 31. As a result, the application 31 finishes the printing. The graphics part 33, for the present, finishes the printing based on the above-mentioned setting of "to display printing preview screen page".

(ii) Further, a UI part 34 starts the Preview.exe 32 based on the setting of "to display printing preview screen page" in response to the reporting by the application 31 of the finish of the printing.

(iii) The Preview.exe 32 carries out preview displaying using the already created rendering data, Job control data and Page control data. The user sees a result of the preview displaying and understands how the printing will be actually carried out; can additionally carry out new settings for the printing, if any, such as collecting plural pages into one page, stapling, punching, bookbinding, and/or the like, of these settings have been forgotten to do; or can change the printing settings.

(iv) When the user then gives an instruction to start printing, the Prview.exe 32 writes "preview setting" in DEVMODE for the purpose of recording that the Preview.exe 32 has called the printer driver 30. The "preview setting" will be described later. The Preview.exe 32 sends DEVMODE' that reflects the new printing settings (if any) to the UI part 34.

(v) Next, the Preview.exe 32 gives an instruction to print to the graphics part 33. For this purpose, the Preview.exe 32 sends the rendering data, Job control data and Page control data to the graphics part 33. The graphics part 33 reads DEVMODE' via the UI part 34, and thus, can detect from the "preview setting" of DEVMODE' that the printer driver 30 has been called by the Preview.exe 32.

(vi) The graphics part 33 first reads DEVMODE' and determines whether the printer driver 30 has been called by a specific application (in this case, the Preview.exe 32). Then, when having determined that the printer driver 30 has been called by the specific application, the graphics part 33 operates as follows:

a. The graphics part 33 newly creates Job control data, using DEVMODE'. Thus, it is possible to reflect the printing settings (if any) that the user has carried out in response to the above-mentioned preview displaying.

b. The graphics part 33 utilizes the Page control data obtained from the Preview.exe 32, as it is (instead of newly creating it). Since all the information required for the Page control data is not included in DEVMODE', the graphics part 33 thus does not generate the Page control data in a case where the printer driver 30 has been thus called by the Preview.exe 32.

c. The rendering data obtained from the Preview.exe 32 is utilized, as it is. Since the rendering data that has been already created by the graphics part 33 is not changed even when the Preview.exe 32 carries out the preview displaying, the graphics part 33 does not need to again create the rendering data. Thus, the graphics part 33 carries out nothing at this stage.

(vii) The graphics part 33 sends the rendering data, Job control data and Page control data to a printer 200.

Thus, the printer driver 30 according to the first embodiment can detect from the "preview setting" of DEVMODE that it has been called by a specific application, and can carry out a special process accordingly.

Configuration Example

Figure 5A:
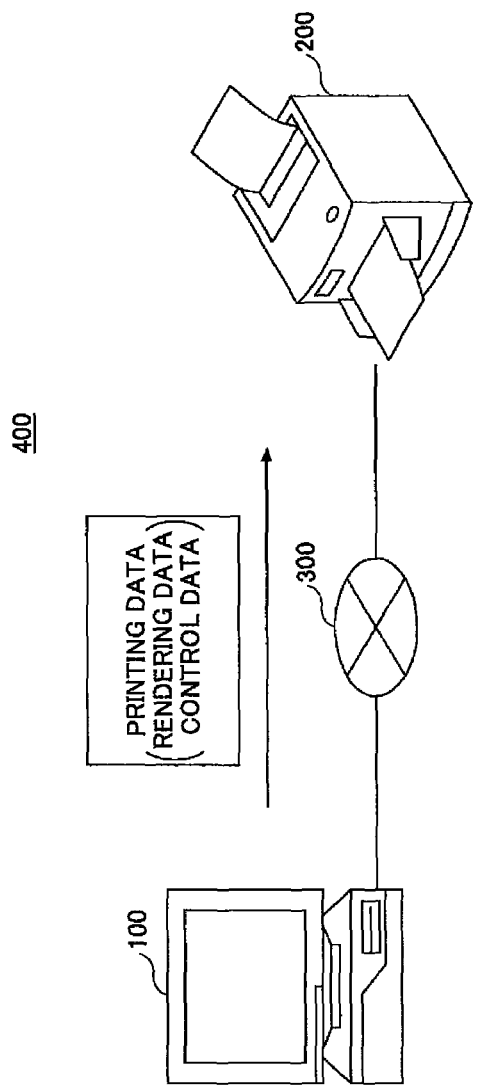
FIG. 5A shows a general configuration of a printing system.
Figure 5B:
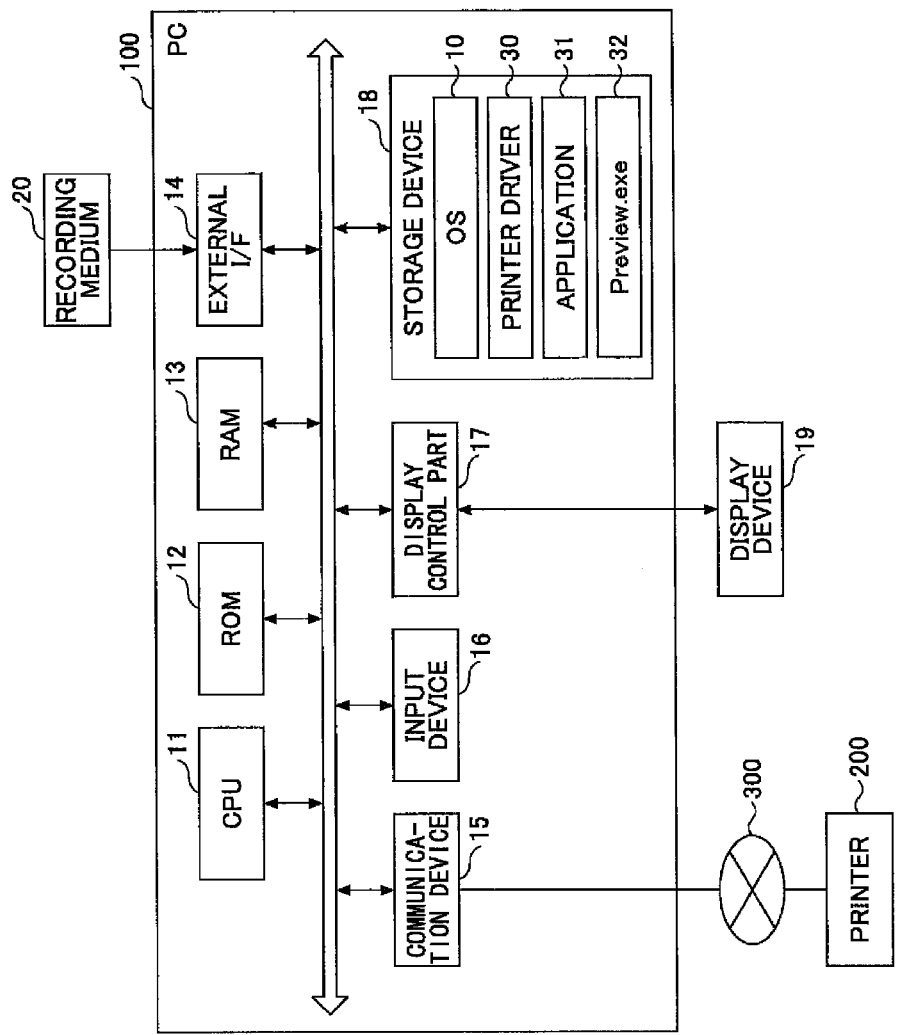
FIG. 5B shows a hardware configuration of a PC.

FIG. 5A shows one example of a general configuration of a printing system 400. FIG. 5B shows one example of a hardware configuration of a Personal Computer (PC) 100. The PC 100 and the printer 200 are connected by a network 300. The PC 100 receives a user's operation, and the application 31 such as document creation software requests printing by using a GDI, a DDI and the printer driver 30. The printer driver 30 creates printing data according to a procedure described later, and transmits the printing data to the printer 200. The printer 200 may be a duplicating machine, a copier, a facsimile machine or the like as long as it has an image forming function. Further, the printer 200 may have an image forming function of an electrophotographic method or an inkjet method. Further, the PC 100 and the printer 200 may also be directly connected by a USB cable or the like.

As shown in FIG. 5B, the PC 100 has a CPU 11, a ROM 12, a RAM 13, an external I/F 14, a communication device 15, an input device 16, a display control part 17 and a storage device 18, which are mutually connected by a bus. The CPU 11 reads an Operating System (OS) 10, the application 31, the printer driver 30 and the Preview.exe 32 from the storage device 18, and executes them by using the RAM 13 as a work area.

The application 31 requests the printer 200 to carry out printing, and may be one of various types, for example, document creation software, browser software, presentation material creation software or the like. The application 31 may be any application as long as it can carry out creating document data to be printed, editing the same, displaying the same, managing the same, and/or so, and print the same. It is noted that the document data may include not only characters/letters, symbols, and/or numerical values, but also various printing targets such as images, photographs and/or the like.

The RAM 13 is used as a work memory (main storage memory) that temporarily stores necessary data. In the ROM 12, BIOS, data that is initially set, a startup program, and/or the like, are stored.

The external I/F 14 is an interface in which a cable such as a USB cable and/or a portable recording medium 20 are/is loaded. The communication device 15 is a LAN card or an Ethernet (registered mark) card, and transmits packet data (i.e., printing data in the first embodiment) to the printer 200 in response to an instruction given by the CPU 11.

The input device 16 is a user interface to receive a user's various operation instructions, such as a keyboard, a mouse, and/or the like. The input device 16 may also be a touch panel or a voice input device. The display control part 17 controls rendering of a display device 19 by a predetermined resolution, the number of colors and/or the like based on image information given by the application 31 as instructions. The display device 19 is a Flat Panel Display (FPD) of liquid crystal, organic EL or the like.

The storage device 18 is a non-volatile memory such as a Hard Disk Drive (HDD), a flash memory or the like, and stores the OS 10, the printer driver 30, the application 31 and the Preview.exe 32.

The recording medium 20 is a non-volatile memory, for example, a SD card, a USB memory, or the like. The OS 10, the application 30, the Preview.exe 32 and the printer driver 30 are distributed in such a manner of being recorded in the recording medium 20 or being downloaded from a server (not shown).

Figure 6A:
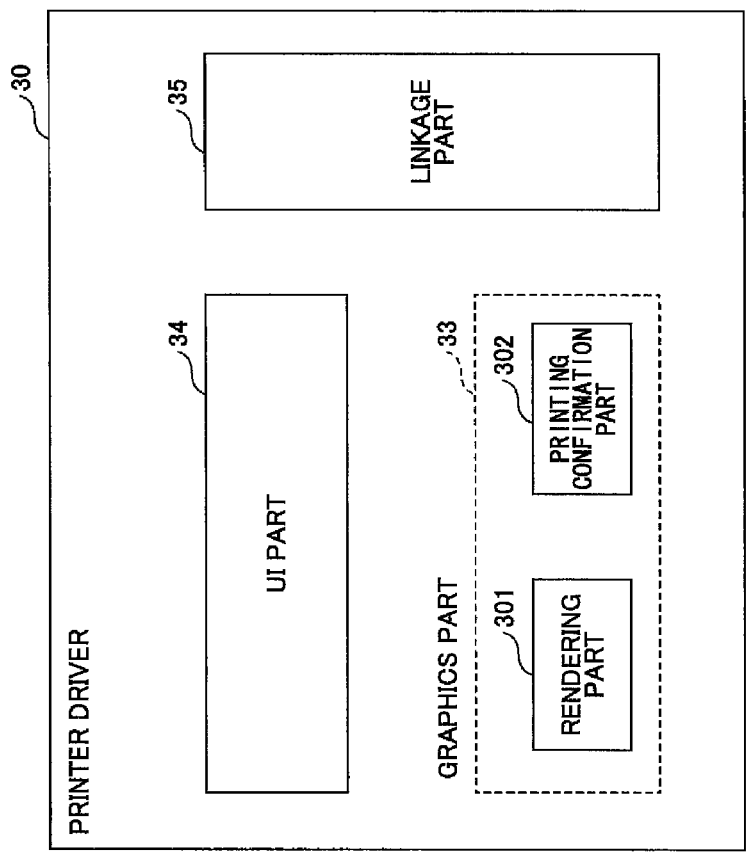
FIG. 6A shows functional blocks of a printer driver.

FIG. 6A shows one example of a functional block diagram of the printer driver 30. The printer driver 30 includes the UI part 34, a graphics part 33 and a linkage part 35. Further, the graphics part 33 has a rendering part 301 and a printing confirmation part 302. Functions that are not necessary for explaining the first embodiment are omitted.

The UI part 34 displays on the display device 19 the printing setting screen page (printing dialog) based on DEVMODE and printing settings that are already stored, and receives printing settings that are set by a user. The UI part 34 stores the received printing settings in DEVMODE, and sends them to the application 31.

The printing confirmation part 302 reads DEVMODE and determines whether an application that is the calling source is a specific application.

The linkage part 35 carries out communication with the Preview.exe 32. For example, the linkage part 35 sends printing data that has been generated by the rendering part 301 to the Preview.exe 32, obtains DEVMODE' from the Preview.exe 32 and sends it to the UI part 34.

Figure 6B:
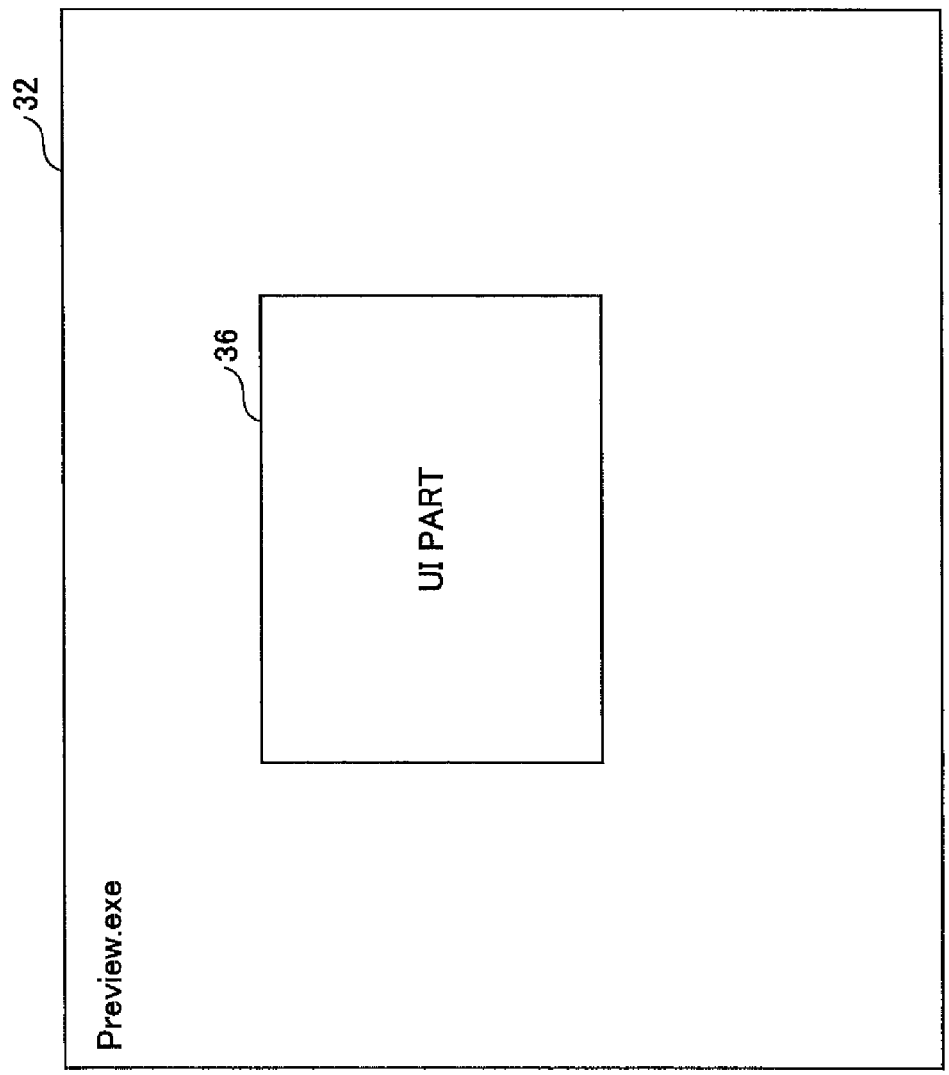
FIG. 6B shows functional blocks of a Preview.exe.

FIG. 6B shows one example of a functional block diagram of the Preview.exe 32. The Preview.exe 32 has a UI part 36. The UI part 36 is another instance generated from the same class as that of the UI part 34 of the printer driver 30. The UI part 36 of the Preview.exe 32 can use printing data generated by the printer driver 30, and carry out preview displaying.

Figure 7:
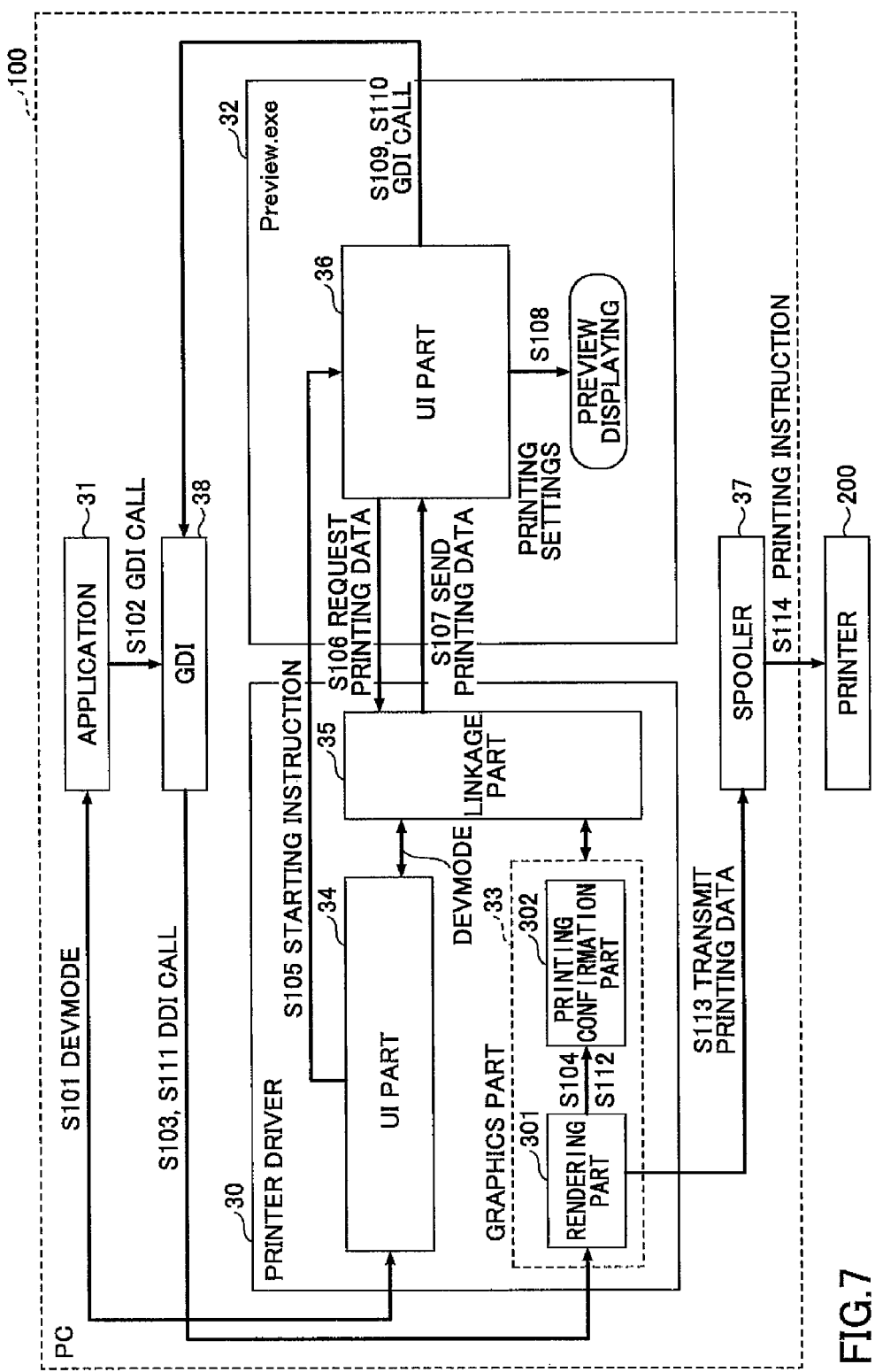
FIG. 7 shows one example of functional blocks of the PC.

FIG. 7 shows one example of a functional block diagram of the PC 100. The PC 100 includes the application 30, the Graphics Device Interface (GDI) 38, the printer driver 30, the Preview.exe 32 and a spooler 37.

The GDI 38 is provided as a program of the OS 10 of Windows (registered trademark) family. The GDI 38 converts a GDI call into a DDI call, and sends the DDI call to the graphics part 33. The spooler 37 spools printing data, and sends it to the printer 200.

<Preview Displaying>

According to the first embodiment, when a user selects "to display printing preview screen page" from the printing setting screen page, the Preview.exe 32 operates.

Figure 8A:
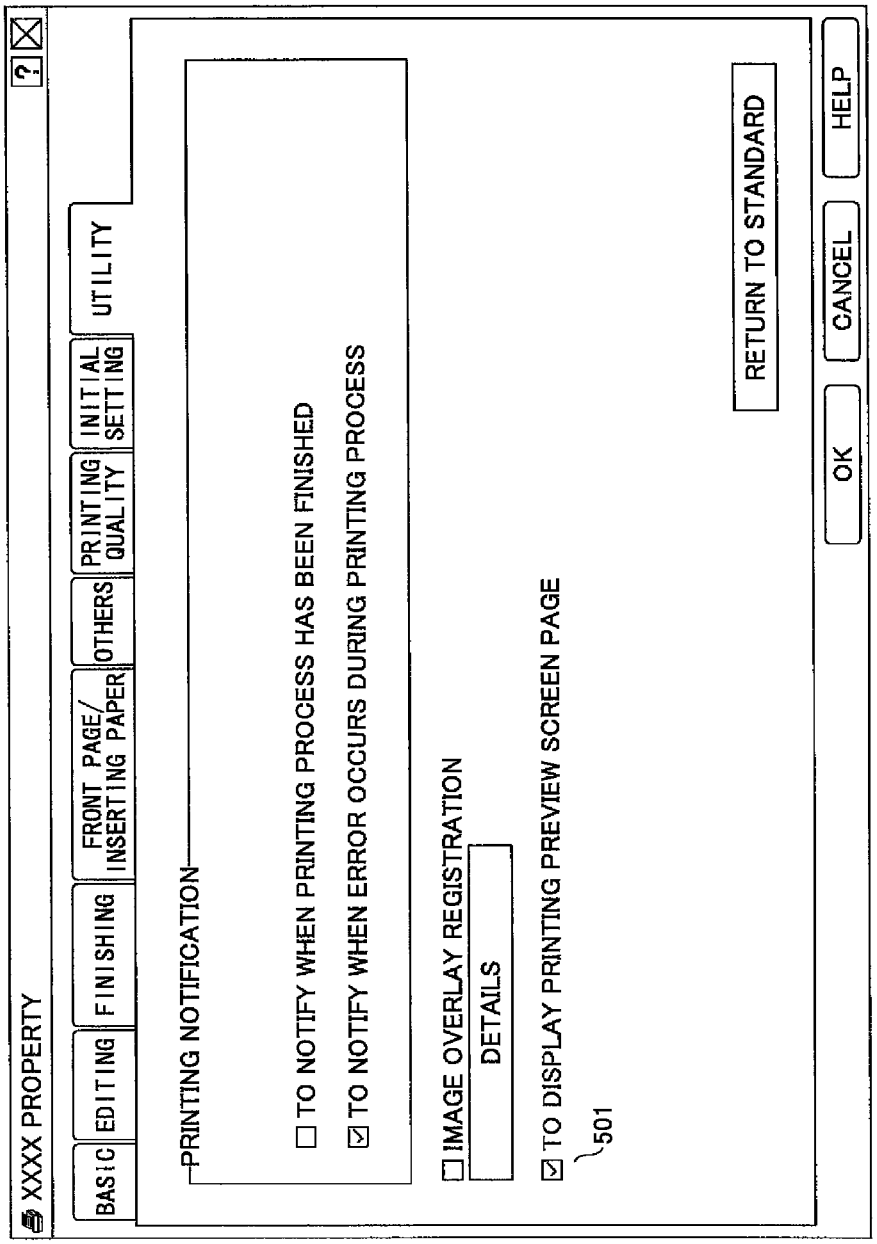

FIG. 8A shows one example of settings for preview displaying that is carried out in the printing setting screen page. For example, a check box 501 of "to display printing preview screen page" is provided at a tab "utility" from among several tabs. When a user has checked the check box 501, the UI part 34 registers, in DEVMODE, the fact that the "to display printing preview screen page" has been selected.

FIG. 8B shows one example of a preview displaying screen page 500 that is displayed after printing is started. In a preview field 502, the document data created by the application 31 is displayed through preview displaying.

Further, using the preview displaying screen page 500, a user can edit respective settings such as:
  a size of printing sheets of paper 503;
  a number of sheets to print 504;
  color/monochrome 505;
  duplex printing/bookbinding 506;
  N-Up printing 507
  Sorting 508
  Stapling 509

Further, a user can edit printing jobs, using the preview displaying screen page 500. By editing jobs, a user can change the order of plural printing jobs, carry out printing of plural printing jobs with the same settings, and/or carry out printing of plural printing jobs as a single job. By editing printing jobs, it is possible to put plural printing jobs in a state of immediately before the printing, and then carry out the printing in a lump or with the same settings.

The "to display printing preview screen page" that has been once set by a user using the printing setting screen page 500 is registered in DEVMODE. Thus, the preview displaying screen page 500 is displayed even when a user has carried out operations to start the printing without confirming the printing settings. Thus, the user can confirm the printing settings before the actual printing is started, and thus, it is possible to avoid a problematic situation of carrying out the printing with erroneous printing settings resulting in a useless consumption of sheets of paper.

<S101 Through S104>

Below, operations of the respective blocks of FIG. 7 will be described in sequence. First, the processes S101 through S104 are those approximately the same as those of the related art.

S101: The application 31 carries out printing settings by sending DEVMODE to the UI part 34.

S102: The application 31 sends a printing instruction to the GDI 38 by a GDI call.

S103: The GDI 38 converts the GDI call into a DDI call, and requests the graphics part 33 to generate printing data.

S104: The printing confirmation part 302 reads DEVMODE, and determines whether the application 31 that is the calling source is a specific application.

Figure 9A:
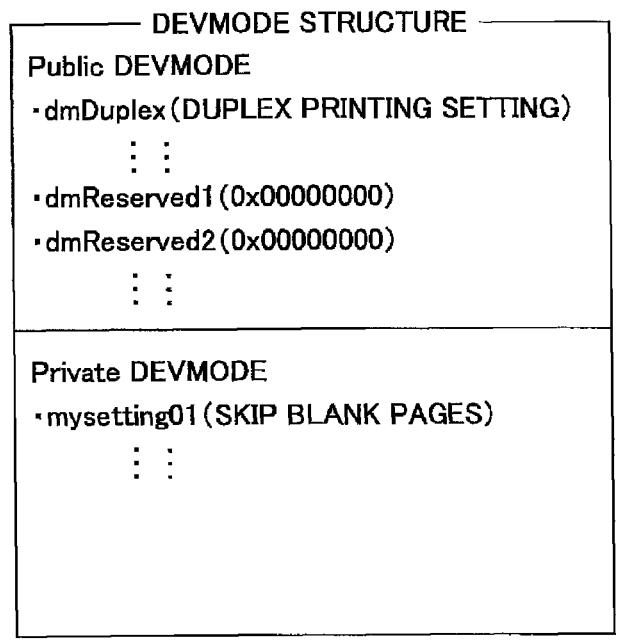
FIGS. 9A and 9B illustrate examples of DEVMODE.

FIG. 9A illustrates one example of DEVMODE. DEVMODE has two areas, i.e., the Public area ("Public DEVMODE") and the Private area ("Private DEVMODE"). The Public area is a common area without regard to the printer 200 and the printer driver 30, member variable common to the respective printer drivers 30 that operate on the OS are defined. The Private area is an extended area in which member variables can be defined for each of the printer drivers 30. In FIG. 9A, "dmDuplex", "dmReserved1" and "dmReserved2" are shown as member variables of the Public area. "mysetting01" is shown as a member variable of the Private area.

The meanings of the member variables of the Public area are prescribed by values that are set therein, respectively. When "DMDUP_SIMPLEX" is set in "dmDuplex", this means that "duplex printing is not carried out". When "DMDUP_HORIZONTAL" is set in "dmDuplex", this means that "duplex printing is carried out while each sheet of paper is reversed in a horizontal direction". When "DMDUP_VERTICAL" is set in "dmDuplex", this means that "duplex printing is carried out while each sheet of paper is reversed in a vertical direction". Further, the printer driver 30 can give a unique meaning to a member variable of the Private area. Thus, for example, when "Yes" is set in "mysetting01", this means to skip blank pages. When "No" is set in "mysetting01", this means not to skip blank pages.

On the other hand, "dmReserved1" and "dmReserved2" are member variables that are not read by the printer driver 30 (i.e., reserved areas that are not currently used) in the Public area. Normally, "0x00000000" is set there.

As will be described later, according to the first embodiment, the Preview.exe 32 sets a value other than "0x00000000" in at least any one of "dmReserved1" and "dmReserved2". Thus, the printing confirmation part 302 reads "dmReserved1" and "dmReserved2", and then, when "0x00000000" has been set there, the printing confirmation part 302 determines that the general application 31 has called the graphics part 33. When a value other than "0x00000000" has been set there, the printing confirmation part 302 determines that a specific application (i.e., the Preview.exe 32) has called the graphics part 33.

When the printing confirmation part 302 has determined that the general application 31 has called the graphics part 33, the rendering part 301 carries out the following rendering process.

Figure 10:
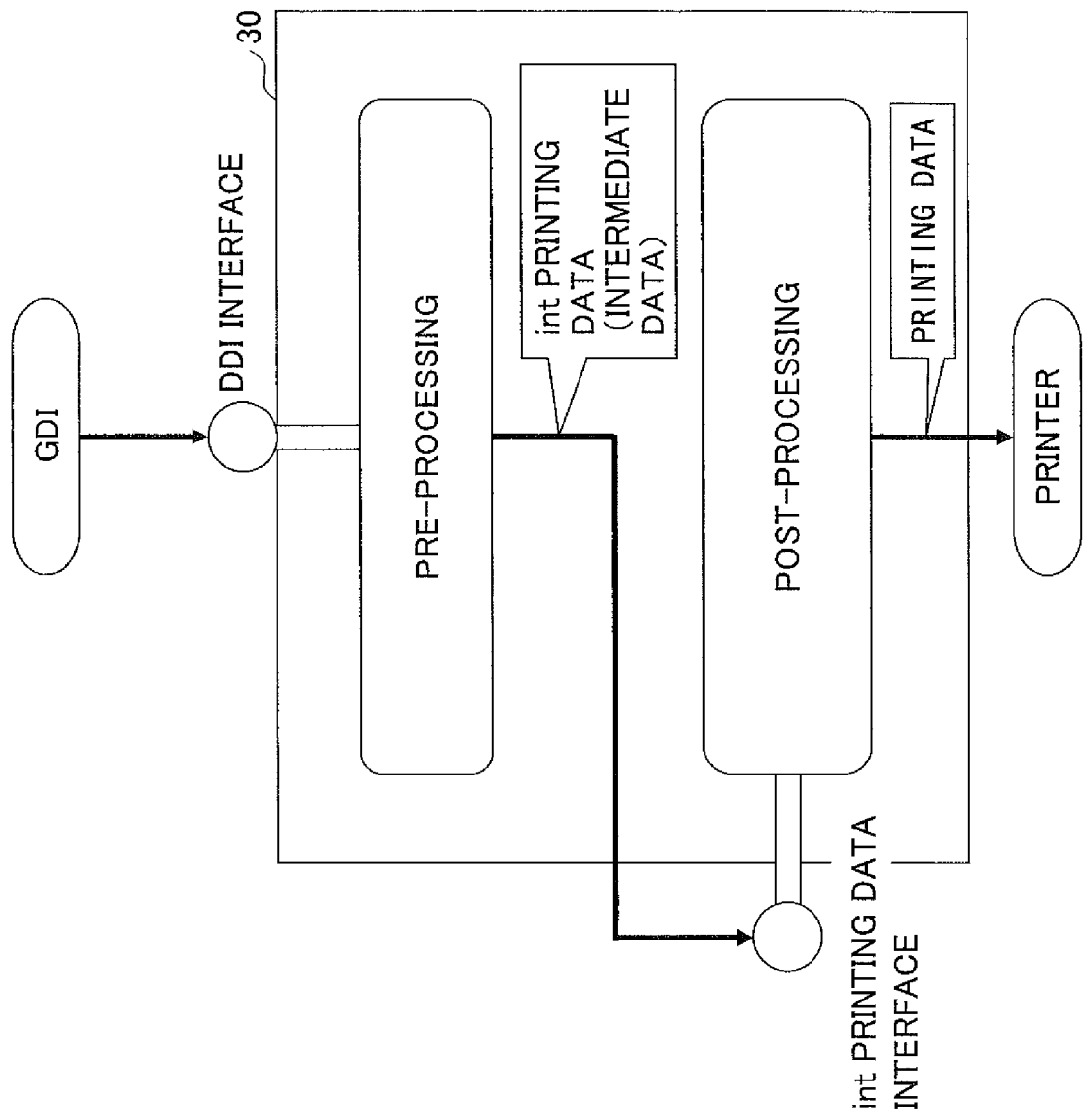
FIG. 10 is one example of a flowchart showing a procedure of a rendering process carried out by a rendering part.

FIG. 10 is a flowchart showing one example of the rendering process that the rendering part 301 carries out. As described above, the rendering part 301 generates rendering data and control data. However, rendering data and control data to be interpreted by the printer 200 and rendering data and control data to be interpreted by the Preview.exe 32 have somewhat different formats. That is, rendering data and control data to be interpreted by the Preview.exe 32 have formats that are used by the printer driver 30 internally, and are intermediate data. In this regard, instead of switching an internal process of the rendering part 301 between a process of one type of generating rendering data and control data for the Preview.exe 32 and a process of generating another type of rendering data and control data for the printer 200 depending on whether preview displaying is to be carried out in the PC 100, implementation is made easier by separating the internal process into two stages to obtain the respective types of rendering data and control data. Thus, the rendering part 301 generates the printing data through two stages, i.e., pre-processing and post-processing, for providing the intermediate data to the Preview.exe 32, regardless of whether a user has selected "to display printing preview screen page". In order to distinguish between the two types of printing data obtained from the pre-processing and the post-processing, respectively, "int" (internal) is attached to the printing data obtained from the pre-processing.

Then, depending on whether a user has selected "to display printing preview screen page", the rendering part 301 carries out the pre-processing and the post-processing in certain timings shown below.

In a case where the user has selected "to display printing preview screen page", the rendering part 301 stops processing after carrying out the pre-processing. The Preview.exe 32 then carries out "preview displaying" using rendering data and control data thus generated by the pre-processing of the first time. After the preview displaying, the rendering part 301 obtains the int printing data from the Preview.exe 32, carries out the pre-processing of the second time, and then, carries out the post-processing.

On the other hand, when a user has not selected "to display printing preview screen page", the rendering part 301 carries out the pre-processing, and then, carries out the post-processing.

That is, in any case, the pre-processing is carried out. However, as will be described later, the pre-processing of the first time and the pre-processing of the second time have different processing contents. The pre-processing of the first time in a case where a user has selected "to display printing preview screen page" and the pre-processing in a case where a user has not selected "to display printing preview screen page" have the same processing contents. Further, the processing contents of the post-processing are the same without regard to whether a user has selected "to display printing preview screen page".

FIGS. 11A and 11B illustrate the two types of printing data obtained from the pre-processing and the post-processing, respectively. The control data is a printing command(s) described in PJL for notifying the printer 200 of control for the entirety of the printing job and control for page units. Thus, the control data will be referred to as Job control data (for the entirety of the printing job) and Page control data (for page units). The rendering data is RAW data of PDL for the printer 200 obtained from converting the document data that is generated by the application 31. The printing data of FIGS. 11A and 11B corresponds to the document data having two pages. One set of Job int control data is required for one set of printing job, and thus, only one set of Job int control data exists in one set of the printing data. On the other hand, Page int control data and int rendering data are generated for each page, and thus, the number of sets of data corresponding to the number of pages are included in one set of the printing data, as shown in FIGS. 11A and 11B.

As shown in FIGS. 11A and 11B, the rendering part 301 generates data shown below at the pre-processing when called by the general application 31:
(a)—general: Job int control data that is created from DEVMODE
(b)—general: Page int control data that is created from DEVMODE
(c)—general: int rendering data that is obtained from converting the document data Further, the rendering part 301 generates data shown below at the post-processing:
(d): Job control data that is created from the Job int control data
(e): Page control data that is created from the Page int control data
(f): rendering data that is created from the int rendering data FIG. 12A shows one example of the Job int control data and FIG. 12B shows one example of the Page int control data. In the Job int control data, control data for printing the entirety of a printing job is registered, such as a printing resolution, a size of sheets of paper, a margin, a number of copies, a tray of sheets of paper, a type of sheets of paper, N-Up, and the like.

In contrast thereto, in the Page int control data (FIG. 12B), control data for printing each page of a printing job is registered, such as a size of original sheets of paper, an orientation of the original sheets of paper, a resolution of the original sheets of paper, a color mode, whether image as a size of original sheets of paper and the like is held in neither DEVMODE nor the Preview.exe 32.

<S105 Through S108>

Returning to FIG. 7, processes S105 through S108 will now be described. The processes S105 through S108 are those for carrying out "preview displaying". When the rendering part 301 has completed the pre-processing, the rendering part 301 notifies the application 31 of this matter. Since "to display printing preview screen page" is registered in DEVMODE, the graphics part 33 finishes the printing job. Further, the application 31 notifies the UI part 34 of the finish of printing.

S105: The UI part 34 of the printer driver 30 reads DEVMODE, and starts the Preview.exe 32.

S106: The UI part 36 of the Preview.exe 32 requests "int printing data" and DEVMODE from the linkage part 35 for the purpose of display a preview screen page.

S107: The linkage part 35 obtains "int printing data" and DEVMODE from the graphics part 33 of the printer driver 30, and sends them to the UI part 36 of the Preiew.exe 32.

S108: The UI part 36 of the Preview.exe 32 carries out "preview displaying" such as that shown in FIG. 8B using the int printing data.

FIG. 13 schematically illustrates one example of the processes of S105 through S108. In FIG. 13, the Preview.exe 32 is inserted between two sets of processes of the printer driver 30 (on the left side and the right side, respectively). The printer driver 30 carries out the pre-processing and the post-processing, and only the contents of the pre-processing are different between before and after (on the left side and the right side, respectively, of) the process of the Preview.exe 32. Through the processes S101 through S104 described above, the pre-processing of the left-side process of the printer driver 30 is finished. The application 31 is released from the printing process at this stage (storing the file by "JobEnd").

The UI part 36 of the Preview.exe 32 obtains "int printing data" and DEVMODE, and thus, carries out the following processes.

(P1) The UI part 36 gives the "int printing data" a printer driver API, and requests the printer driver API to carry out "preview displaying".

(P2) The UI part 36 gives DEVMODE to a DEVMODE editing part, and requests the DEVMODE editing part to receive printing settings that are made by a user and edit DEVMODE accordingly.

It is noted that the printer driver API and the DEVMODE editing part are merely expressions of software implementation, and thus, the Preview.exe 32 may also carry out "preview displaying", receive printing settings and edit DEVMODE accordingly.

The DEVMODE editing part sets a predetermined value(s) in "dmReserved1" and "dmReserved2" (member variables) of DEVMODE without regard to whether a user has changed the printing settings. The predetermined value(s) may be any value(s) other than "0x00000000". In this example, "SA (0x53, 0x41)" are used.

Figure 9B:
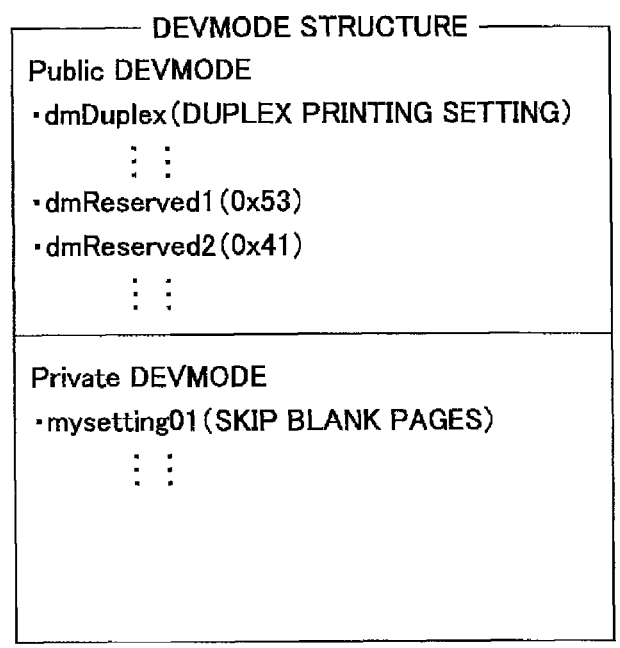

FIG. 9B shows one example of DEVMODE that has been edited by the Prewview.exe 32. As shown, in "dmReserved1" and "dmReserved2", character codes of hexadecimal numbers that mean "SA" are set, as follows:

dmReserved1: 0x53
dmReserved2: 0x41

It is noted that it is not necessary to set values in the two member variables separately, and instead, a predetermined value other than "0x00000000" may be set in any one of "dmReserved1" and "dmReserved2". Such a setting corresponds to the above-mentioned "preview setting".

Member variables of the Public area are values that can also be set by an application. Thus, an application (i.e., the Preview.exe 32) may set a value(s) in "dmReserved1" and/or "dmReserved2". Although it is not impossible to set values of member variables of the Private area, an application cannot know the contents of the Private area, normally. Thus, it is difficult to use a function of a printer, which function is unique to the manufacturer, without using an API or the like for accessing the UI part and/or DEVMODE. However, in the method according to the first embodiment, an application (i.e., the Prewview.exe 32) can easily set a function unique to the manufacturer (i.e., "preview setting").

When a user carries out printing settings and/or editing a printing job using the preview displaying screen page 500 of FIG. 8B and then presses a "print" button 510 thereof, the right-side process of the printer driver 30 in FIG. 13 is started. That is, the Preview.exe 32 transmits the int printing data to the GDI 38 by an Escape ( ) function. The Escape ( ) function is an API for transmitting a printing instruction(s) that cannot be processed by the GDI 38 to the printer driver 30 as it is (or as they are).

FIGS. 14A and 14B schematically illustrate "int printing data" to be transmitted to the printer driver 30 by the Preview.exe 32. FIG. 14A shows "int pitting data" before being changed, and 14B shows "int pitting data" after being changed. The change of "being changed" may include a change made by a user and/or a change of "dmReserved1" and "dmReserved2". In order to indicate the change by a user or the change by the Preview.exe 32, DEVMODE is changed into DEVMODE' in FIG. 14B. In the right-side process of the printer driver 30 in FIG. 13, the pre-processing and the post-processing are carried out on the "int printing data" of FIG. 14B.

<S109 Through S114>

Returning to FIG. 7, processes S109 through S114 will now be described. The processes S109 through S114 are those of sending the "int printing data", which has been received from the Preview.exe 32, to the printer 200 by the printer driver 30.

S109: The UI part 36 of the Preview.exe 32 sends DEVMODE' to the UI part 34 of the printer driver 30. For example, DEVMODE' is designated as an argument of CreateDC ( ).

S110: The UI part 36 of the Preview.exe 32 sends the "int printing data" to the graphics part 33 of the printer driver 30. For example, the "int printing data" that does not include DEVMODE' is transmitted by Escape ( ).

S111: The GDI 38 converts a GDI call of the second time into a DDI call, and requests the graphics part 33 to generate printing data.

S112: The printing confirmation part 302 of the graphics part 33 reads DEVMODE' that the UI part 34 has thus obtained, and determines whether an application that is the calling source is a specific application. At this time, the "preview setting" has been registered in DEVMODE' as shown in FIG. 9B. Thus, the printing confirmation part 302 determines that the specific application (i.e., the Preview.exe 32) has carried out the calling.

S113: The rendering part 301 carries out the pre-processing according to the determination result of the printing confirmation part 302, and then, carries out the post-processing. The rendering part 301 sends the printing data to the spooler 37.

S114: The spooler 37 gives the printer 200 the printing data, and gives an instruction thereto to carry out printing.

Figure 15:
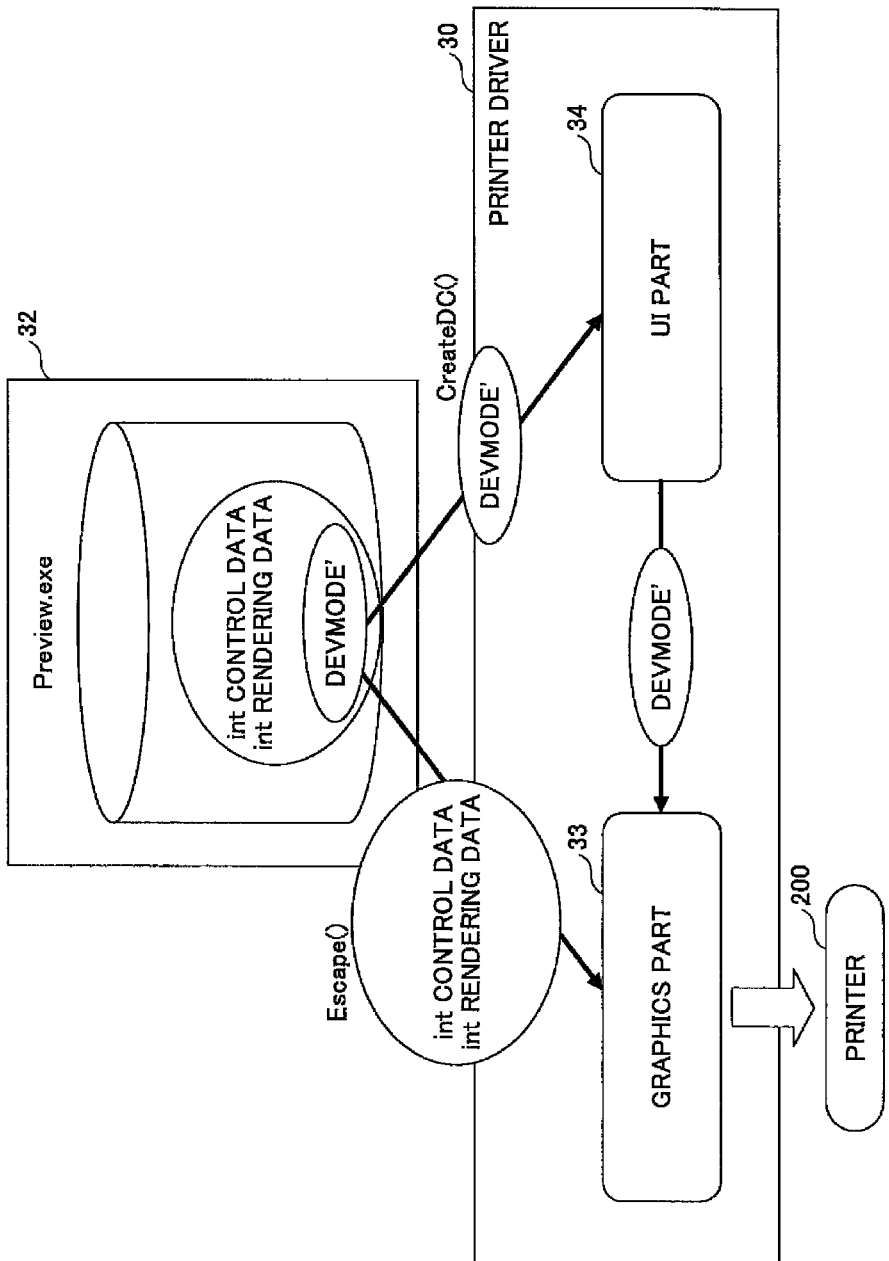
FIG. 15 schematically illustrates one example of processes of the PC.

FIG. 15 schematically illustrates the processes S109 through S114. As mentioned above, the Preview.exe 32 sends DEVMODE' to the UI part 34 and sends the "int printing data" to the graphics part 33. The rendering part 301 needs DEVMODE', and thus, the UI part 34 sends DEVMODE' to the rendering part 301. It is noted that the rendering part 301 operates under the system privilege of the OS 10, and the UI part 34 operates under the user privilege. Thus, the rendering part 301 and the UI part 34 cannot communicate with one another directly. However, they can access DEVMODE (or DEVMODE') in common.

After that, the process of the printer driver 30 shown on the right side of FIG. 13 is started. As mentioned above, the rendering part 301 generates data shown below based on the determination result indicating that the printing confirmation part 302 has been called by the specific application.

(a)—specific: Job int control data that is generated from DEVMODE'
(b)—specific: Page int control data that has been obtained from Preview.exe 32 (i.e., Page int control data is not created from DEVMODE')
(c)—specific: the int rendering data that will be given to the post-processing That is, in a case where the rendering part 301 has been called by the specific application (i.e., the Preview.exe 32), the int printing data that has been already created is obtained, and thus, a process is skipped over for data for which the process is not required.

The rendering part 301 generates data shown below in the post-processing.

(d): Job control data that is created from the Job int control data (newly created)
(e): Page control data that is created from the Page int control data (the same as the original one)
(f): rendering data that is created from the int rendering data (the same as the original one)

The printer 200 can carry out printing as usual by using the printing data thus obtained from the post-processing.

[Operation Procedure]

Figure 16:
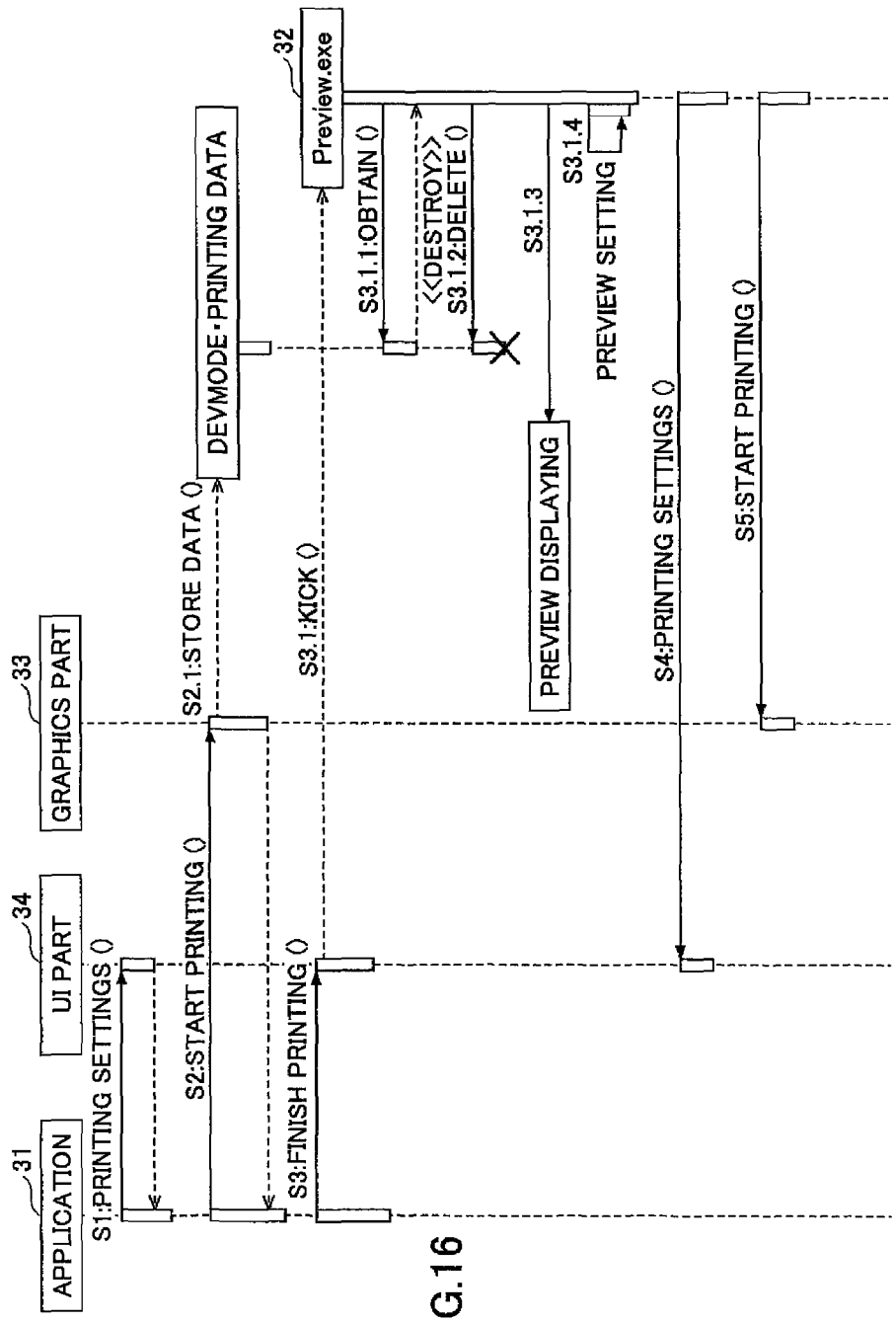
FIG. 16 is one example of a sequence diagram illustrating an operation procedure of processes of the PC.

FIG. 16 is one example of a sequence diagram illustrating an operation procedure of the PC 100. It is noted that in FIG. 16, the GDI 38 and so forth are omitted.

S1: As a result of a user's operation, the application 31 starts the UI part 34, and the user carries out printing settings. The application 31 carries out the printing settings in the UI part 34 (i.e., creates DEVMODE).

S2: The application 31 calls the graphics part 33 via the GDI 38, and starts printing.

S2.1: The rendering part 301 of the graphics part 33 reads DEVMODE, and carries out the pre-processing of generating the data of "(a)—general" through "(c)—general" (mentioned above) that are those generated in the pre-processing when the rendering part 301 has been called by the general application 31. DEVMODE and the thus created "int printing data" are stored as a file.

S3: The application 31 gives an instruction to the UI part 34 to finish printing, when the "int printing data" has been thus generated.

S3.1: The UI part 34 starts the Preview.exe 32 since "to display printing preview screen page" has been set in DEVMODE.

S3.1.1: The Preview.exe 32 obtains the "int printing data" and DEVMODE.

S3.1.2: The Preview.exe 32 deletes the "int printing data" and DEVMODE, from which the "int printing data" and DEVMODE have been thus obtained in S3.1.1. This is because, since the Preview.exe 32 has thus already secured the "int printing data" and DEVMODE, the "int printing data" and DEVMODE that have been previously stored are to be deleted so that existence of the two sets of the "int printing data" and DEVMODE will be avoided. It is noted that the deletion process of S3.1.2 may be carried out after "preview displaying" instead of this timing.

S3.1.3: The Preview.exe 32 carries out "preview displaying".

S3.1.4: The Preview.exe 32 carries out "preview setting" in dmReserved1 and dmReserved2 of DEVMODE.

S4: The Preview.exe 32 requests the UI part 34 to start printing.

S5: The Preview.exe 32 calls the GDI 38 with the Escape ( ) function, and starts printing.

Thus, the rendering part 301 reads DEVMODE', and generates the data of "(a)-specific" through "(c)-specific" (mentioned above) and carries out the post-processing.

Thus, in the printer driver 30 according to the first embodiment, a specific application carries out "preview setting" in DEVMODE, thus the graphics part 33 detects that it has been called by the specific application, and thus can carry out special processes.

[Variant]

A variant of the first embodiment will now be described. According to the first embodiment, the Preview.exe 32 carries out "preview setting" in dmReserved1 and dmReserved2 of DEVMODE. However, it is also possible to carry out "preview setting" in another member variable(s) of the Public area.

Figure 17:
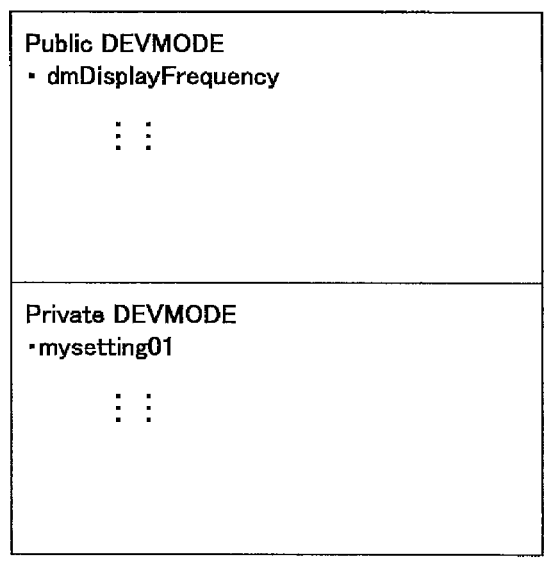
FIG. 17 shows one example of "preview setting" to be registered as other member variables of a Public area.

FIG. 17 shows one example of "preview setting" to be registered in another member variable(s) of the Public area. "dmDisplayFrequency" is a member variable for designating the frequency of the display device 19 in Hz units. This member variable does not function at a time of printing by the printer 200 (i.e., is not read when printing data is created). Thus, this member variable can be used by the Preview.exe 32 for "preview setting". Any value may be set in "dmDisplayFrequency". However, since usually a numerical value is set there, the Preview.exe 32 may set in "dmDisplayFrequency" a character code (for example, "Prev") or the like other than a numerical value.

Thus, in the printer driver 30 according to the first embodiment or the variant thereof, processing contents of the graphics part 33 can be controlled by using a member variable(s) of DEVMODE which is not used depending on a device.

Second Embodiment

As a second embodiment, a printer driver 30 will be described in which a graphics part 33 determines an application that has carried out calling without using DEVMODE.

At a time of printing document data, an application calls a GDI 38 with a StartDoc ( ) function. The format of the StartDoc ( ) function is, for example, as follows:

```
"int StartDoc(
    HDC hdc,              //handle a device context
    CONST DOCINFO *lpdi   //designate a file name
);"
```

It is noted that "hdc" is included in a return value of a CreateDC ( ) function that the application 31 has already called. "DOCINFO" is called a DOCINFO structure. In the DOCINFO structure, a document name of document data and a document name of an output file are designated. "*lpdi" is a pointer to the DOCINFO structure.

FIG. 18A shows one example of a format of the DOCINFO structure.

In "cbSize", the size of the DOCINFO structure is designated.

In "lpszDocName", the name of document data is designated.

In "lpszOutput", a pointer to a character string that indicates the name of an output file is designated. It is also possible to designate NULL in "lpszOutput".

In "lpszDataType", a character string that indicates a data type for recording a printing job is designated.

In "fwType", additional information of the printing job is designated.

The application 31 manages the document name of document data, and thus, the document name is known. Thus, it is possible to notify the GDI 38 of the document name of document data, by setting the document name in "lpszDocName" of the DOCINFO structure when carrying out a GDI call using the StartDoc ( ) function.

Then, the GDI 38 uses a DrvStartDoc function when calling the graphics part 33 with a DDI call.

FIG. 18B shows one example of a format of the DrvStartDoc ( ) function.

In "*pso", a pointer to a SURFOBJ structure is stored.

In "pwszDocName", a pointer to the document name of document data to be printed is stored.

In "dwJobId", JOBID for uniquely identifying the job is stored.

Thus, the graphics part 33 can obtain the document name of document data from an argument "pwszDocName" of the DrvStartDoc ( ) function.

Thus, by giving a specific name as the document name of document data that is thus set in "lpszDocName" when a specific application (i.e., a Preview.exe 32) calls the StartDoc ( ) function, the graphics part 33 can determine that it has been called by the specific application (i.e., the Preview.exe 32).

FIG. 19 shows one example of the document name that the Preview.exe 32 gives. The Preview.exe 32, for example, attaches a suffix such as "_PREVIEW" to the document name of document data, i.e., "memo pad-untitled-" (resulting in "memo pad-untitled-_PREVIEW"), and then, sets the thus obtained document name of document data in "lpszDocName". It is noted that a document name that the application 31 such as document creation software manages is included in "Job int control data".

It is noted that, in FIG. 19, the suffix is attached to the document name. However, it is also possible to attach a prefix instead. In this case, the Preview.exe 32 attaches a prefix "PREVIEW-" to the document name of document data, i.e., "memo pad-untitled" (resulting in "PREVIEW-memo pad-untitled"). Thus, in this case, in "lpszDocName", the thus obtained document name "PREVIEW-memo pad-untitled" is set.

The above-mentioned "PREVIEW" is one example, and, any other word or term which a user rarely attaches at the beginning or the end of a document name may be used instead. For example, "Special_Application" or the like may be used. Further, it is not necessary to select such a word or term that has meaning. It is also possible to use a random combination of characters/letters, signs and/or numerals, of greater than or equal to a predetermined number of characters, digits, or the like.

Figure 20:
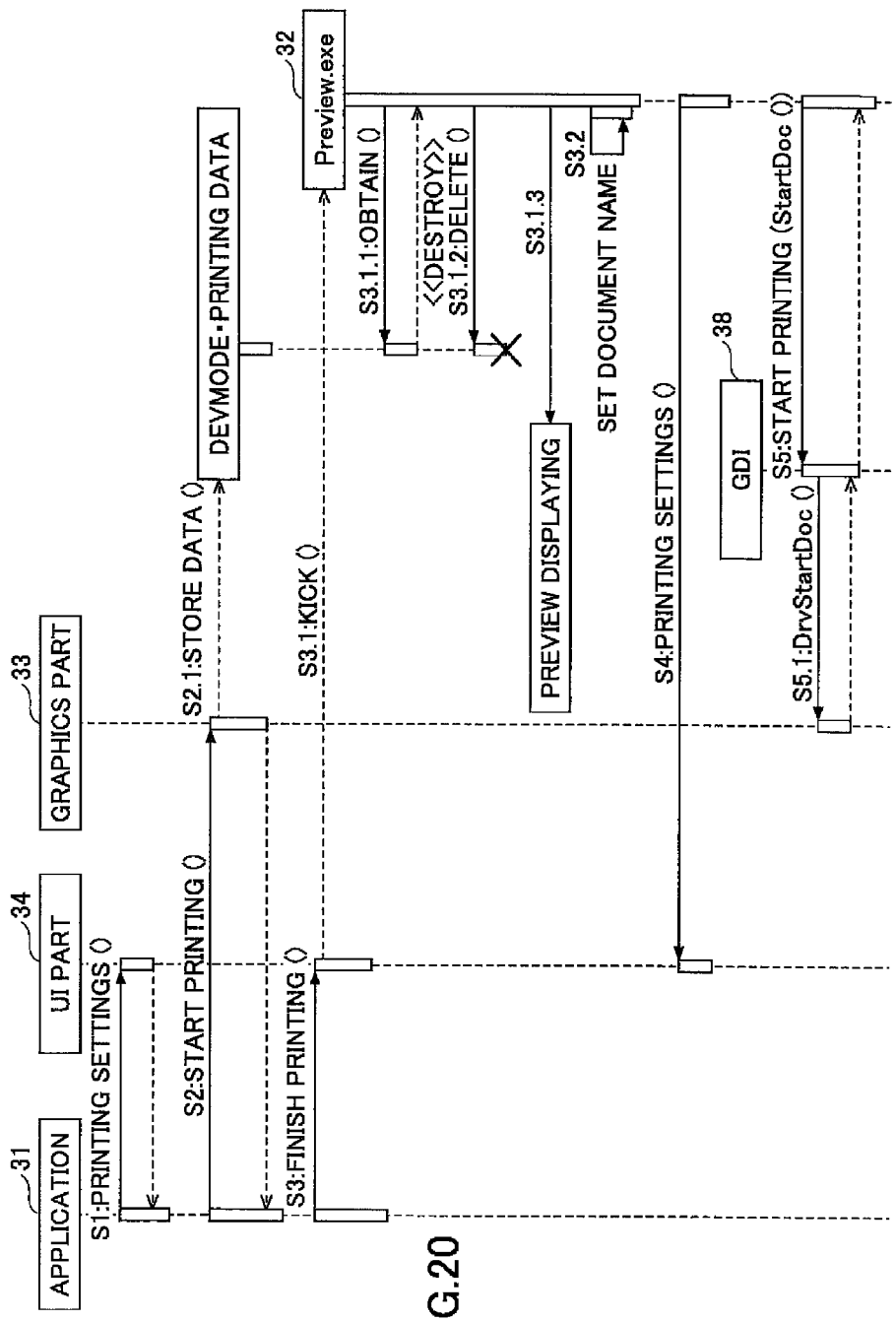
FIG. 20 is one example of a sequence diagram illustrating an operation procedure of the PC.

FIG. 20 is one example of a sequence diagram illustrating an operation procedure of the PC 100. Of the processes of FIG. 20, those from S1 through S3.1.3 are the same as those of FIG. 16.

S1: As a result of a user's operation, the application 31 starts the UI part 34, and the user carries out printing settings. The application 31 carries out the printing settings in the UI part 34 (i.e., creates DEVMODE).

S2: The application 31 calls the graphics part 33 via the GDI 38, and starts printing.

S2.1: The rendering part 301 of the graphics part 33 reads DEVMODE, and carries out the pre-processing of generating the data of "(a)—general" through "(c)—general" to be generated when the rendering part 301 has been called by the general application 31. DEVMODE and the thus created "int printing data" are stored as a file.

S3: The application 31 gives an instruction to the UI part 34 to finish printing when the "int printing data" has been thus generated.

S3.1: The UI part 34 starts the Preview.exe 32 since "to display printing preview screen page" has been set in DEVMODE.

S3.1.1: The Preview.exe 32 obtains the "int printing data" and DEVMODE.

S3.1.2: The Preview.exe 32 deletes the "int printing data" and DEVMODE from which the "int printing data" and DEVMODE have been thus obtained in S3.1.1. This is because, since the Preview.exe 32 has thus already secured the "int printing data" and DEVMODE, the "int printing data" and DEVMODE that have been previously stored are to be deleted so that existence of the two sets of the "int printing data" and DEVMODE will be avoided. It is noted that the deletion process of S3.1.2 may be carried out after "preview displaying" instead of this timing.

S3.1.3: The Preview.exe 32 carries out "preview displaying".

S3.2: The Preview.exe 32 sets the document name, to which "PREVIEW-" has been attached, in "lpszDocName" until calling the GDI 38.

S4: The Preview.exe 32 starts the UI part 34 and carries out printing settings. According to the second embodiment, DEVMODE is sent to the UI part 34 when the user has not changed printing settings.

S5: The Preview.exe 32 starts printing by calling the StartDoc ( ) function to the GDI 38.

S5.1: The GDI 38 carries out a DDI call to the graphics part 33 with the DrvStartDoc ( ) function.

Thus, the rendering part 301 reads "pwszDocName", obtains the document name, to which "PREVIEW-" has been attached in S3.2, determines that it has been called by the specific application (i.e., the Preview.exe 32), thus generates the data of "(a)-specific" through "(c)-specific" and carries out the post-processing.

Thus, in the printer driver 30 according to the second embodiment, as a result of a specific application setting a specific document name to document data, the graphics part 33 detects that it has been called by the specific application, and can carry out specific processes.

According to the embodiments, it is possible to provide an information processing apparatus by which it is possible to carry out a different process depending on an application that has carried out a call.

The information processing apparatus, the computer readable information recording medium and the method of controlling the information processing apparatus have been described by the embodiments. However, the present invention is not limited to these embodiments, and variations and modifications may be made without departing from the scope of the present invention.

The present application is based on Japanese Priority Application No. 2011-196124, filed Sep. 8, 2011, the entire contents of which are hereby incorporated herein by reference.

What is claimed is:

1. An information processing apparatus, comprising:
a printing setting reception part to generate setting information from printing settings at a time of a printing request from an application;
an image processing part to convert document data obtained from the application into printing data for a printer based on the setting information; and
an application determination part to determine whether an application that has called the image processing part is a specific application, by determining whether the setting information includes specific application information described by the specific application, wherein
the image processing part is configured to generate the printing data, in a case where the application determination part has determined that the image processing part has been called by the specific application, by a method different from a method to generate the printing data in a case where the image processing part has been called by an application other than the specific application,
the image processing part is configured to generate the printing data from the setting information and the document data, in a case where the image processing part has been called by an application other than the specific application, and
the image processing part is configured to generate the printing data by using a part of the printing data that the image processing part has generated before being called by the specific application, in a case where the image processing part has been called by the specific application.

2. The information processing apparatus as claimed in claim 1, wherein
the specific application is an application that is called by the printing setting reception part and starts, and does not generate document data.

3. The information processing apparatus as claimed in claim 2, wherein
the application notifies the printing setting reception part of a finish of printing at a stage at which the image processing part has generated the printing data, and the printing setting reception part starts the specific application.

4. The information processing apparatus as claimed in claim 1, wherein
the specific application is a preview application that displays on a display device the printing data that the image processing part has generated.

5. The information processing apparatus as claimed in claim 1, wherein
the specific application information of the setting information is described as a member variable of DEVMODE that provides common printing conditions for plural printer drivers that operate on a predetermined operating system.

6. The information processing apparatus as claimed in claim 5, wherein
the specific application information of the setting information is described in dmReserved1 or dmReserved2 of the member variables of the DEVMODE.

7. The information processing apparatus as claimed in claim 5, wherein
the specific application information of the setting information is described in a variable that is used only for displaying and is not used at a time of printing, of the member variables of the DEVMODE.

8. The information processing apparatus as claimed in claim 1, wherein
the specific application information written in the argument of the function for calling the image processing part is written in a first function for the specific application to call an OS and a second function for the OS to call the image processing part.

9. The information processing apparatus as claimed in claim 8, wherein
the specific application information is described at the beginning or the end of a document name of the document data.

10. A non-transitory computer readable information recording medium storing a program which, when executed by one or more processors, performs at least
generating setting information from received printing settings at a time of a printing request given by an application;
calling an image processing part and converting document data obtained from the application into printing data for a printer based on the setting information;
determining whether an application that has called the image processing part is a specific application, by determining whether the setting information includes specific application information described by the specific application; and
generating printing data, via the image processing part and in a case where the determining has determined that the image processing part has been called by the specific application, by a method different from a method to generate the printing data in a case where the image processing part has been called by an application other than the specific application, wherein the printing data is generated from the setting information and the document data, in a case where the image processing part has been called by an application other than the specific application, and wherein the printing data is generated by using a part of the printing data that the image processing part has generated before being called by the specific application, in a case where the image processing part has been called by the specific application.

11. The non-transitory computer readable information recording medium of claim as claimed in claim 10, wherein
the specific application is an application that is called by the printing setting reception part and starts, and does not generate document data.

12. The non-transitory computer readable information recording medium of claim as claimed in claim 10, wherein
the specific application is a preview application that displays on a display device the printing data that the image processing part has generated.

13. A method of controlling an information processing apparatus that includes a printing setting reception part and an image processing part, the method comprising:
generating, by the printing setting reception part, setting information from received printing settings at a time of a printing request given by an application;
calling the image processing part and converting, by the image processing part, document data obtained from the application into printing data for a printer based on the setting information;
determining whether an application that has called the image processing part is a specific application, by determining whether the setting information includes specific application information described by the specific application; and
generating printing data, via the image processing part and in a case where the determining has determined that the image processing part has been called by the specific application, by a method different from a method to generate the printing data in a case where the image processing part has been called by an application other than the specific application, wherein the printing data is generated from the setting information and the document data, in a case where the image processing part has been called by an application other than the specific application, and wherein the printing data is generated by using a part of the printing data that the image processing part has generated before being called by the specific application, in a case where the image processing part has been called by the specific application.

14. The method of controlling the information processing apparatus as claimed in claim 13, wherein
the specific application is an application that is called by the printing setting reception part and starts, and does not generate document data.

15. The method of controlling the information processing apparatus as claimed in claim 14, wherein
the application notifies the printing setting reception part of a finish of printing at a stage at which the image processing part has generated the printing data, and the printing setting reception part starts the specific application.

16. The method of controlling the information processing apparatus as claimed in claim 13, wherein
the specific application is a preview application that displays on a display device the printing data that the image processing part has generated.

17. The method of controlling the information processing apparatus as claimed in claim 13, wherein
the specific application information of the setting information is described as a member variable of DEVMODE that provides common printing conditions for plural printer drivers that operate on a predetermined operating system.

18. The method of controlling the information processing apparatus as claimed in claim 17, wherein
the specific application information of the setting information is described in dmReserved1 or dmReserved2 of the member variables of the DEVMODE.

19. The method of controlling the information processing apparatus as claimed in claim 17, wherein
the specific application information of the setting information is described in a variable that is used only for displaying and is not used at a time of printing, of the member variables of the DEVMODE.

20. The method of controlling the information processing apparatus as claimed in claim 13, wherein the specific application information written in the argument of the function for calling the image processing part is written in a first function for the specific application to call an OS and a second function for the OS to call the image processing part.

* * * * *